United States Patent
Mamba et al.

(10) Patent No.: US 8,416,257 B2
(45) Date of Patent: Apr. 9, 2013

(54) VIDEO SIGNAL PROCESSING CIRCUIT, DISPLAY DEVICE, MOBILE TERMINAL, AND PROGRAM

(75) Inventors: Osamu Mamba, Osaka (JP); Koji Otsuka, Osaka (JP); Yasufumi Hagiwara, Osaka (JP); Daisuke Koyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/937,170

(22) PCT Filed: Apr. 6, 2009

(86) PCT No.: PCT/JP2009/057060
§ 371 (c)(1),
(2), (4) Date: Oct. 8, 2010

(87) PCT Pub. No.: WO2009/125743
PCT Pub. Date: Oct. 15, 2009

(65) Prior Publication Data
US 2011/0080524 A1    Apr. 7, 2011

(30) Foreign Application Priority Data

Apr. 11, 2008  (JP) ................ 2008-103711

(51) Int. Cl.
*G09G 5/02* (2006.01)

(52) U.S. Cl.
USPC ........................................ 345/600

(58) Field of Classification Search ............ None
See application file for complete search history.

(56) References Cited

U.S. PATENT DOCUMENTS

| | | | |
|---|---|---|---|
| 6,961,037 B2 * | 11/2005 | Kuwata et al. | 345/88 |
| 2006/0284822 A1 * | 12/2006 | Kerofsky et al. | 345/102 |

FOREIGN PATENT DOCUMENTS

| | | |
|---|---|---|
| EP | 0 595 353 A1 | 5/1994 |
| JP | 2007-142983 A | 6/2007 |
| JP | 2007-241120 A | 9/2007 |

OTHER PUBLICATIONS

European Search Report issued Apr. 25, 2012.

*Primary Examiner* — Xiao M. Wu
*Assistant Examiner* — Mohammad H Akhavannik
(74) *Attorney, Agent, or Firm* — Birch, Stewart, Kolasch & Birch, LLP

(57) ABSTRACT

Shown is a diagram showing input-output characteristics for color adjustment. The horizontal axis represents an input, and the vertical axis represents an output. In this color adjustment technique, first, so as to prevent degradation the luminance of white after white correction, correction coefficients are determined so that the smallest value thereof may be 1. Note that "1" here is not a strict value. To be more specific, in contrast to the conventional technique in which correction is performed with the largest value being made equal to about "1," the present embodiments sets the smallest value at about "1." This idea itself is a first point which makes the embodiments different from the conventional technique. When doing so, all the correction coefficients are "1" or larger. In the case where a correction coefficient is "1" or larger, when the input is large, the output is saturated. To prevent the saturation, the saturation suppressed using an n-degree curve ($X_{ucurve}$) which is, for example, a quadratic curve or a cubic curve. If doing so, degradation in the maximum luminance due to correction processing can be suppressed while the hue of white is maintained in a practical luminance range (0 to 70%) for video images of a television receiving set (TV), or the like. Thereby, degradation in the maximum luminance due to correction processing can be suppressed while the hue of white is maintained.

15 Claims, 20 Drawing Sheets

US 8,416,257 B2

VIDEO SIGNAL PROCESSING CIRCUIT, DISPLAY DEVICE, MOBILE TERMINAL, AND PROGRAM

TECHNICAL FIELD

The present invention relates to image processing, and particularly to an image processing technique for facilitating excellent white display.

BACKGROUND ART

In color television broadcasting such as NTSC/PAL (EBU), R, G, B chromaticity points and a standard white point are defined for each broadcasting system. A TV video image is adjusted in color based on those defined colors, and then broadcasted. Thus, a predetermined color (white) is expected to be displayed on a display device. When a video image is to be displayed on a display device, such as a liquid crystal display, based on digital RGB video data, a general practice is to cause the display device to perform color adjustment on white through γ correction, and to thereby display the predetermined white.

However, some display devices are not capable of performing hue adjustment (γ correction). In a display device described in Patent Literature 1 given below, RGB video signals are subjected to image processing before being inputted to the display device. Main constituents of this display device include an acquisition unit (an illuminance sensor), a converter (a controller), a correction unit (a color correction circuit), an output unit (a display device), and a storage unit (RAM).

FIG. 16 is a diagram showing an example of input-output characteristics based on the technique of Patent Literature 1 given below. Chromaticity coordinates for displaying white on the display device are acquired. Then, correction coefficients are obtained for respective RGB in order for the display device to output predetermined white, and the intensity of each of RGB video signals is thereby corrected. As FIG. 16 shows, the RGB correction coefficients are determined so that the largest value may be 1.0 while maintaining the ratio among the coefficients for the purpose of outputting the predetermined white. The input-output characteristics are represented by only straight lines. Accordingly, the correction coefficients have linear inclinations. Since the ratio among RGB is maintained at a constant value over the entire input region, there is an advantage that the predetermined white can be outputted no matter what the input may be.

[Patent Literature 1] Japanese Patent Application Publication No. 2007-241120

DISCLOSURE OF THE INVENTION

Problems to be Solved by the Invention

The technique described above, however, has a problem that the luminance of white degrades because the GB lines do not rise up to their respective maximum values, as shown in FIG. 16. Further, when digital RGB video data is corrected, some components have correction coefficients of 1 or smaller, because the input-output characteristics for merely maintaining the constant ratio among RGB are used. This leads to a problem of degradation in the maximum luminance of (G, B).

The present invention has an objective to prevent degradation in the maximum luminance, which would otherwise occur in correction processing, while maintaining the hue of white.

Means for Solving the Problems

A video signal processing circuit according to the present invention maintains the maximum luminance by: calculating RGB correction coefficients for the purpose of outputting predetermined white; then by adjusting the correction coefficients so that the smallest correction coefficient among RGB may be almost 1; and by adjusting the correction coefficients so that input luminance and output luminance may match each other. For the rest of the color components, a component with a correction coefficient of 1 or larger is adjusted using an n(n>1)-degree curve, such as a quadratic curve, so that the input-output characteristic coefficient may not be saturated.

On the other hand, for a component with a correction coefficient of smaller than 1, the input-output characteristic is raised using a quadratic curve so that the output may reach the maximum value when the input is at the maximum value.

A first aspect of the present invention provides a video signal processing circuit that includes a video signal input-output conversion processor configured to convert an input value of each of RGB video signals into an output value of a corresponding one of the RGB video signals, and that outputs the output value of the video signal input-output conversion processor to a display unit. The video signal processing circuit is characterized by including a white corrector configured: to adjust initial correction values (initial correction coefficients) so that the smallest one of the initial correction values becomes substantially equal to 1 or larger, the initial correction values each represented by a linear line, defined by an inclination of a first input-output characteristic of a corresponding one of RGB colors, and used to display predetermined white; to correct the first input-output characteristic of each of the other colors by use of a corresponding one of the correction values of the respective RGB so that the ratio among the initial correction values (initial correction coefficients) of the respective RGB is substantially maintained; and to replace, in a high luminance region, the first input-output characteristic of a color, the correction value of which exceeds 1, with a second input-output characteristic curving upward and being represented by an n(n>1)-degree curve. The predetermined white is white generated based on any one of a standard white point defined by a video source side and a white point defined in a color space used for moving or still image content.

In other words, the "predetermined white" is white expected to be displayed on a display device through color adjustment based on the RGB chromaticity points and the standard white point defined for each broadcasting system. For example, the predetermined white is white generated based on a standard white point defined in color TV broadcasting system such as NTSC/PAL (EBU), or based on a white point defined in a color space, such as sRGB, sYCC, or AdobeRGB, used for video content delivered through the Internet or the like or still image content taken by a digital camera or the like.

An actual input-output characteristic can be obtained by suppressing a saturation region which appears in the high luminance region when the correction value exceeds 1.

Note that, although the linear line does not always have to be a complete linear line, the linear line is preferable for making processing simple. Further, making the smallest value of the correction values become substantially equal to 1 does not mean to make it become exactly equal to 1. The value "1" is just shown as an ideal value. The n-degree curve used to suppress the saturation is preferably a relatively simple curve, such as a quadratic curve or a cubic curve, to make the processing simple.

With the correction described above, all of the RGB colors have a correction value of 1 or larger, and therefore white can be displayed brightly. Note that, when the smallest value of the correction values exceeds 1, degradation in the maximum luminance due to correction processing can be suppressed while the hue of white is maintained in a practical luminance range (0 to 70%) for TV video images or the like. Further, as the smallest value among the correction values is closer to 1, the gradient in the high luminance region can be increased.

Since a video image actually broadcasted through TV broadcasting or the like, particularly a video image such as a natural image, has few extremely-bright scenes, the luminance range of most video images is roughly within a range of 0 to approximately 70% of the input luminance. Accordingly, in practice, it is sufficient that the predetermined white can be outputted in the range of 0 to approximately 70% of the input luminance.

It is desirable that: the first input-output characteristic and the second input-output characteristic should have a cross-point in the range of the input; and the first input-output characteristic should be switched to the second input-output characteristic at the cross-point. It is desirable that: the first input-output characteristic should cover the range of 0 to approximately 70% which is a practical luminance range; and the second input-output characteristic should cover the range exceeding the 70%.

In addition, provided is a video signal processing circuit that includes a video signal input-output conversion processor configured to convert an input value of each of RGB video signals into an output value of a corresponding one of the RGB video signals, and that outputs the output value of the video signal input-output conversion processor to a display unit. The video signal processing circuit is characterized by including a white corrector configured: to adjust initial correction values so that input luminance and output luminance become substantially equal to each other, the initial correction values each represented by a linear line, defined by an inclination of a first input-output characteristic of a corresponding one of RGB colors, and used to display predetermined white; to correct the first input-output characteristic of each of the other colors by a corresponding one of correction values of the respective RGB so that a ratio among the initial correction values of the respective RGB is substantially maintained; to replace, in a high luminance region, the first input-output characteristic of a color, the correction value of which exceeds 1, with a second input-output characteristic curving upward and being represented by an n(n>1)-degree curve; and to replace, in the high luminance region, the first input-output characteristic of a color, the correction value of which falls below 1, with a third input-output characteristic curving downward and being represented by an n(n>1)-degree curve.

For the color whose correction value exceeds 1, its first input-output characteristic is replaced, in the high luminance region, with the second input-output characteristic curving upward and being represented by an n(n>1)-degree curve. Thereby, an actual input-output characteristic is obtained by suppressing a saturation region which appears in the high luminance region when the correction value exceeds 1. Moreover, for the color whose correction value falls below 1, its first input-output characteristic is replaced, in the high luminance region, with the third input-output characteristic curving downward and being represented by an n(n>1)-degree curve. Thereby, an actual input-output characteristic is obtained by compensating a reduction in the luminance which appears in the high luminance region when the correction value falls below 1.

Note that terms "predetermined white," "substantially," and the like are used to mean the same as described above.

It is desirable that: the first input-output characteristic and each of the second and third input-output characteristics should have a cross-point in an input luminance range; and the first input-output characteristic should be switched to any one of the second and third input-output characteristics at the cross-point. It is desirable that: the first input-output characteristic should cover the range of 0 to approximately 70% which is a practical luminance range; and the second and third input-output characteristics should cover the range exceeding the 70% which is the practical luminance range. γ correction processing by a display device may stop once the white corrector is activated.

The present invention may be a display device including: the foregoing video signal processing circuit; and a display unit configured to display a video image based on a video signal processed by the video signal processing circuit. It is desirable that the display device should further include an operation unit configured to perform an operation of changing the above-described parameter (at least any one of the correction values and a curvature of the n(n>1)-degree curve). The present invention may be a mobile communications terminal including: the foregoing display device; and a communications unit for making communications.

Note that the present invention may be a method for implementing the functions described above, a program for causing a computer to execute the method, and a computer-readable storage medium for storing the program. The program may be that which is acquired through a transmission medium.

Effects of the Invention

According to the present invention, degradation in the maximum luminance due to correction processing can be prevented while the hue of white is maintained in a practical luminance range (0 to 70%) for TV video images or the like. Moreover, the brightness of a displayed image can be maintained.

DESCRIPTION OF SYMBOLS

31 . . . video signal processing circuit, 33 . . . register, 35 . . . first image processing circuit, 37 . . . second image processing circuit, 41 . . . third image processing circuit, 45 . . . first arithmetic circuit, 47 . . . second arithmetic circuit.

BEST MODES FOR CARRYING OUT THE INVENTION

In this description, "predetermined white" is defined as follows. Specifically, in color TV broadcasting such as NTSC/PAL (EBU), R, G, B chromaticity points and a standard white point are defined for each broadcasting system. A TV video image is adjusted in color based on those defined colors, and then broadcasted. Thus, a predetermined color (white) is expected to be displayed on a display device. A color expected as to white is called "predetermined white" herein. In other words, "predetermined white" is white expected to be displayed on a display device through color adjustment based on the RGB chromaticity points and the standard white point defined for each broadcasting system. Note that, other than the white point defined for the color TV broadcasting, a white point defined in a color space, such as sRGB, sYCC, or AdobeRGB, used for moving-image content delivered through the Internet or the like, or still image content taken by a digital camera or the like may be used for the "predetermined white." In addition, "initial correction values (initial correction coefficients)" are correction values which, in a condition where white is displayed on a display device, are obtained by adjusting the respective RGB levels so that the chromaticities of displayed colors may coincide with that of the predetermined while by measuring the displayed colors by use of a measuring instrument such as a colorimeter.

Figure 16:
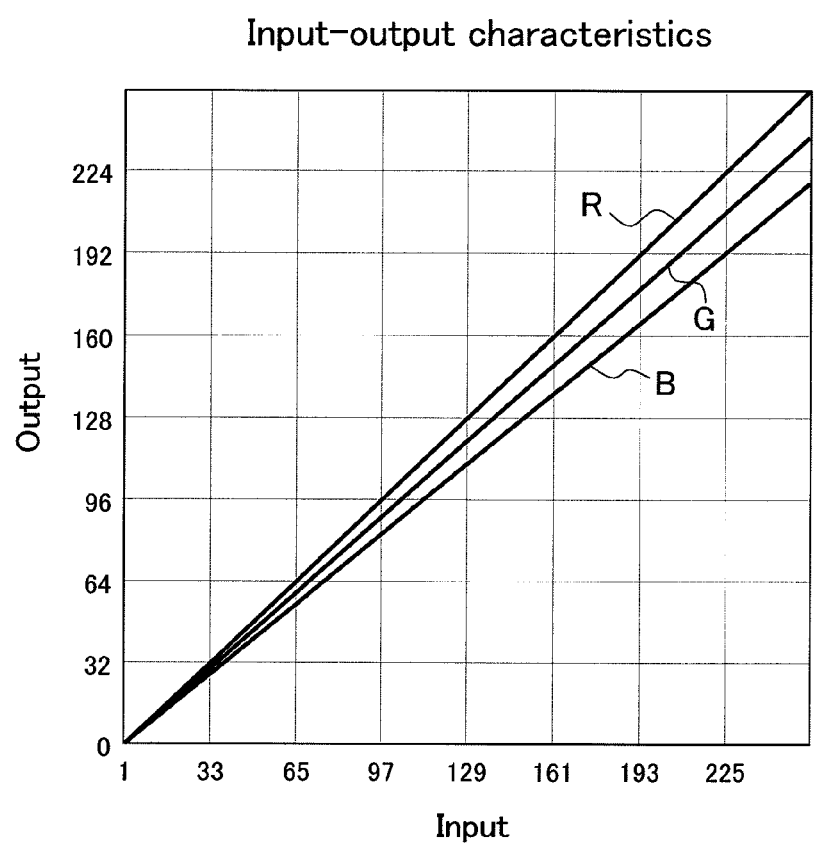
FIG. 16 is a diagram showing an example of input-output characteristics based on the technique according to Patent Literature 1.

Before describing embodiments of the present invention, consideration made by the inventors is briefly described. In the characteristics shown in FIG. 16, adjustment is made in order to make the largest correction coefficient equal to 1. With such method, however, brightness cannot be maintained.

The inventors have come up with an idea that: the respective initial correction values (initial correction coefficients) $A_R, A_G, A_B$ for RGB, are calculated for outputting predetermined white; thereafter, inclinations are adjusted using linear curves so that, instead of the largest correction coefficient which is the largest among the correction coefficients $A_R, A_G, A_B$, the smallest correction coefficient which is the smallest thereamong may be set equal to 1; and thereby the maximum luminance is maintained. Degradation in the maximum luminance due to correction processing is suppressed while the hue of white is maintained particularly in a practical luminance range (0 to 70%) of TV video images or the like. In the case of a color component having a correction coefficient of "1" or larger, when doing so, the input-output characteristic is saturated near beyond the practical range. For this reason, adjustment is made through replacement with a quadratic curve or the like smoothly continuous to the linear curve near beyond the practical range so as not to saturate the input-output characteristics. In other words, the linear curve and the quadratic curve are connected as smoothly as possible. Thereby, the display can be performed without awkwardness in a range beyond the practical luminance range, too, while the hue of white is maintained in the practical luminance range (0 to 70%).

Figure 1:
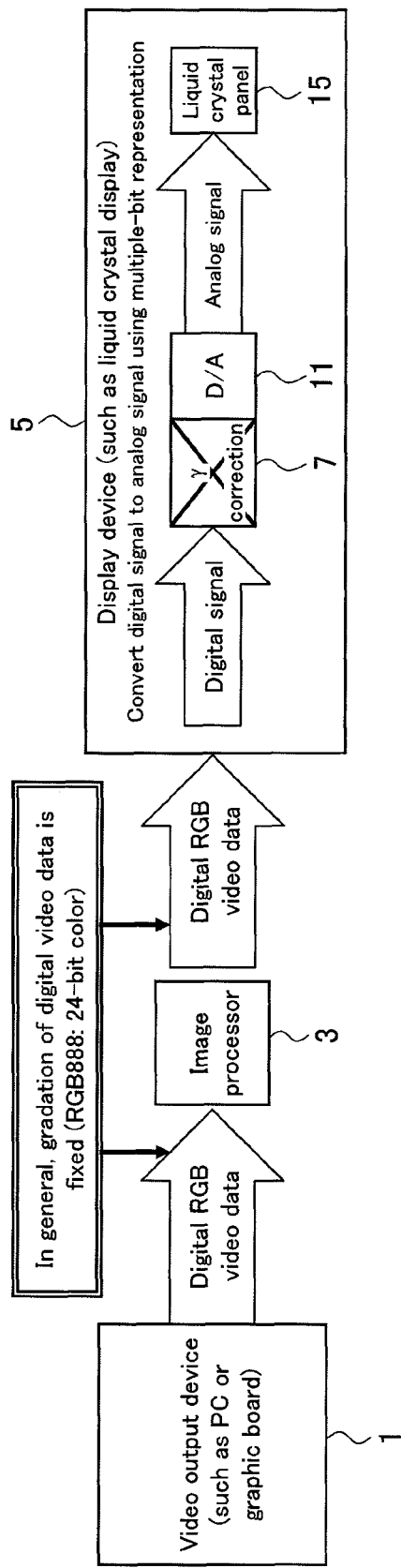
FIG. 1 is a diagram showing an outline of an image processing system according to embodiments of the present invention.

FIG. 1 is a diagram showing an outline of an image processing system of the present embodiments. As FIG. 1 shows, digital RGB video data from a video signal output device 1, such as a personal computer (PC) or a graphic board, is subjected to image processing including white correction processing in an image processor 3 of the present embodiments to be described later. As an output signal, output data thus obtained is outputted to a display device 5 such as a liquid crystal display device.

In the display device 5, regardless of whether the display device 5 has no adjustment function 7 for γ correction and the like or the display device 5 has the adjustment function 7 but does not make use thereof, the inputted digital RGB video data is directly converted into an analog signal by a D/A converter 11, and the analog signal is given to a display panel such as a liquid crystal panel 15. Thus, proper correction can be made on white as well.

The embodiments of the present invention will be described below in detail based on the above consideration.

Figure 2A:
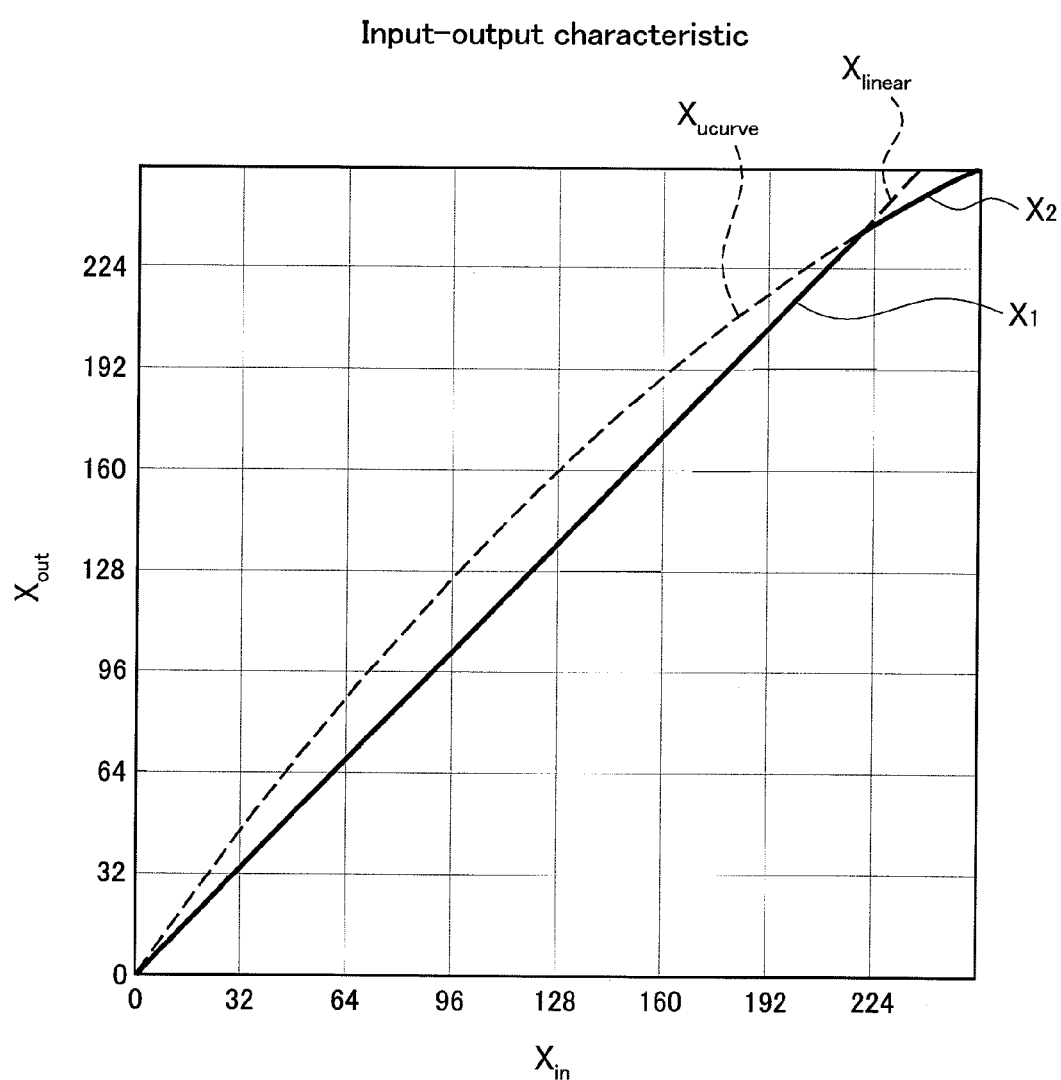
FIG. 2A is a diagram showing input-output characteristics for color adjustment according to a first embodiment of the present invention.

First, referring to the drawings, a color adjustment technique according to a first embodiment of the present invention is described. FIG. 2A is a diagram showing an example of input-output characteristics for performing video signal input-output conversion processing using a video signal processing circuit for color adjustment according to the first embodiment of the present invention. The horizontal axis indicates the value of an input signal, and the vertical axis indicates the value of an output signal. The color adjustment technique according to the present embodiment first determines correction coefficients so that the smallest value thereamong may be made equal to 1 in order to prevent degradation of the luminance of white after white correction.

Note that "1" mentioned here is not a strict value. To be more specific, in contrast to the conventional technique in which correction is performed with the largest value being made equal to about "1," the present embodiments sets the smallest value at about "1." This idea itself is a first point which makes the present embodiments different from the conventional technique. By doing so, all the correction coefficients become "1" or larger. Note that, if the smallest value among the correction values exceeds 1, degradation in the maximum luminance due to the correction processing can be suppressed while the hue of white is maintained in the practical luminance range (0 to 70%) for TV video images or the like. Further, as the smallest value among the correction values is closer to 1, the gradient in a high luminance region can be increased.

In a case where a correction coefficient is equal to "1" or larger, when the input is large, the output is saturated. To avoid the occurrence of the saturation, the saturation is suppressed using an n-degree curve ($X_{ucurve}$), for example, a quadratic curve or a cubic curve. When such first video signal input-output conversion processing is performed, degradation in the maximum luminance due to the correction processing can be suppressed while the hue of white is maintained in the practical luminance range (0 to 70%) for video images of a television receiving set (TV), or the like.

A "parameter determination method" for color adjustment is described below by use of an example. Parameters shown below used in the present embodiment are set in a register or the like before starting the white processing.

$A_x$: magnification ($1 < A_x < \infty$)

$C_x$: curvature ($0 < C_x \leq 1$)

$(X=R,G,B)$ [Expression 1]

Here, the initial correction values (initial correction coefficients) of R, G and B, which are obtained by use of the conventional method for the purpose of displaying predetermined white, are denoted by $A_{RI}, A_{GI}$ and $A_{BI}$, respectively. In the present embodiment, correction coefficients obtained by the following equations are used as new correction coefficients for displaying the predetermined white and maintaining the luminance. In other words, magnifications ($A_R$, $A_G$, $A_B$) are determined based on the following equations.

[Expression 2]

$$A_R = A_{RI} \times 1/(\min(\min(A_{RI},A_{GI}),A_{BI})) \quad \text{Equation 1-1}$$

$$A_G = A_{GI} \times 1/(\min(\min(A_{RI},A_{GI}),A_{BI})) \quad \text{Equation 1-2}$$

$$A_B = A_{BI} \times 1/(\min(\min(A_{RI},A_{GI}),A_{BI})) \quad \text{Equation 1-3}$$

These equations will be described in a complement provided later.

Next, the curvature ($C_x$) of a quadratic curve is determined so that a straight-line portion obtained by the first video signal input-output conversion processing (this portion is called a first input-output characteristic herein) may be smoothly connected to a quadratic curve portion (this portion is called a second input-output characteristic herein). Here, a quadratic curve is used as an example of the n-degree curve (n>1).

A correction equation is described below. Correction on video data is performed using (Equation 1-4) given below, where $X_{in}$ denotes a video input (input signal) and $X_{out}$ denotes a video output (output signal). Note that, in (Equation 1-4) below, the same processing is performed on each of the RGB components by substituting X with R, G and B. $A_x$, $C_x$ in the following equations can be obtained through parameter fitting. In the drawing shown in FIG. 2A as an example, out of two input-output characteristics, namely $X_{linear}$ and $X_{ucurve}$, $X_{in}$ is shifted from $X_{linear}$ to $X_{ucurve}$ near 224. Specifically, the input-output characteristic is represented by X1-X2, as shown in the solid line in FIG. 2A.

It is preferable that second video signal input-output conversion processing should be performed in a way that: $X_{ucurve}$ is replaced with $X_{linear}$ at $X_{in}$ before $X_{linear}$ is saturated; and $X_{out}$ reaches about 255 when $X_{in}$ reaches 255. Here, it is preferable that $X_{linear}$ and $X_{ucurve}$ should be connected together as smoothly as possible at their joint portion. For this reason, if linear curves (straight lines) are connected to each other, it is highly likely that smoothness is lost to cause awkward display at the joint portion.

[Expression 3]

$$X_{out} = \min(X_{linear}, X_{ucurve}) \quad \text{Equation 1-4}$$

$$X_{linear} = A_x \cdot X_{in} \quad \text{Equation 1-5}$$

$$X_{ucurve} = (1-C_x) \cdot X_{in}^2 + C_x \cdot X_{in} \quad \text{Equation 1-6}$$

<Complement 1>

$Y=\min(a,b)$ described above operates as follows.

[Expression 4]

$Y=\min(a,b)$ operates as follows.

$Y = \{_{b(a \geq b)}^{a(a<b)}$

<Complement 2>

[Expression 5]

$Y=\max(a,b)$ operates as follows.

$Y = \{_{b(a \leq b)}^{a(a>b)}$

In the above-described example of the video signal input-output conversion processing, a quadratic curve is used for the saturation suppression method. Note, however, that other n-degree curves, such as a cubic curve, may be used instead. When a larger degree (n) is used for the portion to be suppressed from saturation, the straight line and the n-degree curve can be connected together more smoothly, thus improving the image quality. However, the representing of the saturation suppression portion by a line having a small n-degree, such as a linear line, has an advantage of reducing the circuit size.

Figure 2B:
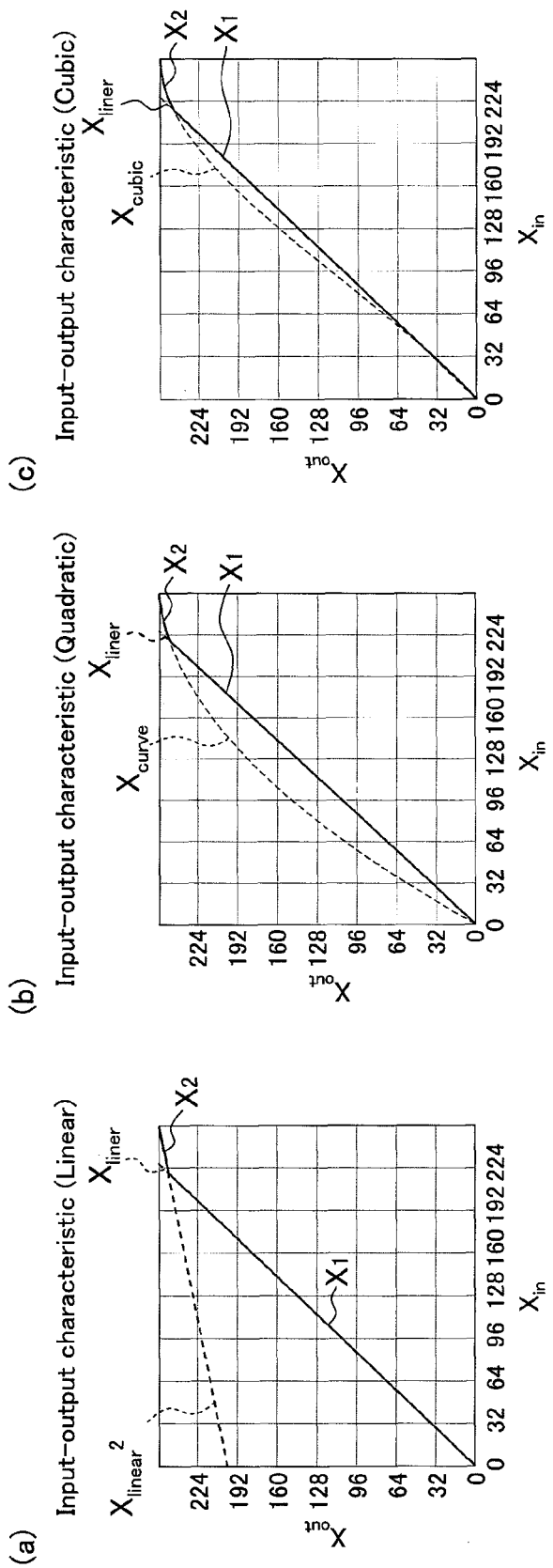
FIG. 2B is a diagram showing examples of cases where a line connected to a linear line is a linear line (a), a quadratic curve (b), and a cubic curve (c).

FIG. 2B is a diagram showing examples where a line connected to the linear line in the video signal input-output conversion processing is a linear line (a), a quadratic curve (b), and a cubic curve (c). As shown in the drawing, as the degree n in the saturation suppression portion becomes larger, a shift between the straight line portion (X1) and the n-degree curve (X2) becomes smoother, and the image quality becomes better.

However, the representing of the saturation prevention portion by a line having a low n-degree, such as a linear line, allows reduction in the circuit size. Basically, what degree to set for n is determined when designing the product. However, the n may be changed by a user while the user checks the image quality. Otherwise, the n may be controlled by a content provider in order that the image quality may match the content through a scheme in which the content provider provides the content as a package.

As described above, the image processing technique including the video signal input-output conversion processing according to the present embodiment offers an effect that degradation in the maximum luminance due to the correction processing can be suppressed while the hue of white is maintained in the practical luminance range (0 to 70%) for TV video images or the like.

Figure 3A:
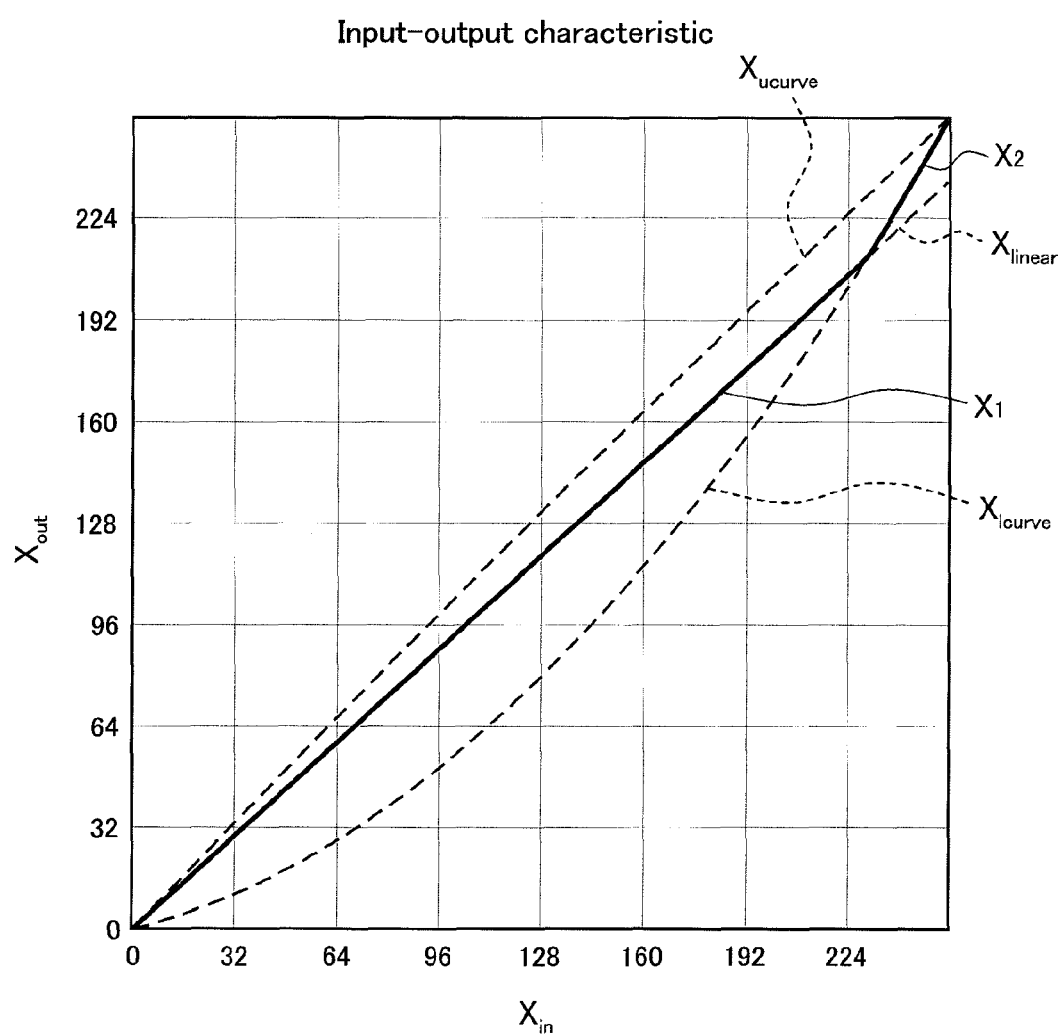
FIG. 3A is a diagram showing input-output characteristics for color adjustment in an image processing system according to a second embodiment of the present invention.

Next, referring to the drawings, an image processing system according to a second embodiment of the present invention is described. The image processing technique using a video signal processing circuit according to the present embodiment is characterized in that the first video signal input-output conversion processing for adjusting correction coefficients is performed so that the luminance of an input video image based on an input signal of a white correction circuit may match the luminance of an output video image based on an output signal thereof, as shown in FIG. 3A. Thereby, components are divided into ones with a correction coefficient of 1 or larger and ones with a correction coefficient smaller than 1. For the components with a correction coefficient of 1 or larger, saturation suppression is performed as in the case of the second video signal input-output conversion processing according to the first embodiment described above. For the components with a correction coefficient smaller than 1, video signal input-output conversion processing is performed in such a manner that, as shown in FIG. 3A, the input-output characteristic is raised using a downward quadratic curve ($X_{lcurve}$) curving downward so that the output reaches the maximum value when the input is at the maximum value. When doing so, as shown with X1 and X2, the luminance can be maintained by raising the output of the input-output characteristic on the high luminance side, and the linear curve and the downward quadratic curve can be connected smoothly. As in the first embodiment, a cubic curve or the like may be used instead of the downward quadratic curve.

The present embodiment offers the following effects in addition to the effects of the first embodiment. Specifically, the brightness of a displayed image can be maintained also on the high luminance side of the input.

A "parameter determination method" is described below. The following parameters to be used are set in a register or the like before starting the white processing.

$A_x$: magnification ($1 < A_x < \infty$)

$C_x$: curvature ($0 < C_x \leq 1$)

$D_x$: downward curvature ($0 \leq D_x < 1$)

($X=R, G, B$) [Expression 6]

[Expression 7]

$$Y = 0.3*R + 0.6*G + 0.1*B \quad \text{Equation 2-1}$$

A correction coefficient ($A_x$) is determined for the purpose of keeping the luminance of the input and output. Here, R, G, and B are weighted with their respective weighting coefficients each determined based on the degree by which the color contributes to the luminance.

x indicates any of R, G, or B. Using (Equation 2-1) given above for the equation representing the conversion of RGB to luminance (Y), magnifications ($A_R, A_G, A_B$) used in principle 2 can be determined as follows, where initial correction values (initial correction coefficients) coefficients obtained for outputting predetermined white are $A_{RI}, A_{GI}, A_{BI}$.

[Expression 8]

$$A_R = A_{RI} \times 1/(0.3*A_{RI} + 0.6*A_{GI} + 0.1*A_{BI}) \quad \text{Equation 2-2}$$

$$A_G = A_{GI} \times 1/(0.3*A_{RI} + 0.6*A_{GI} + 0.1*A_{BI}) \quad \text{Equation 2-3}$$

$$A_B = A_{BI} \times 1/(0.3*A_{RI} + 0.6*A_{GI} + 0.1*A_{BI}) \quad \text{Equation 2-4}$$

Curvatures ($C_x$, $D_x$) are determined for the purpose of smoothly connecting the straight line portion and the quadratic curve portion. Here, a known technique such as parameter fitting may be used.

[Correction Equation]

Video data is corrected using Equation (2-5), where $X_{in}$ denotes a video input (input signal) and $X_{out}$ denotes a video output (output signal). Note that the same processing is performed for each of the RGB components by substituting X with R, G and B.

[Expression 9]

$$X_{out} = \min(\max(X_{linear}, X_{lcurve}), X_{ucurve}) \quad \text{Equation 2-5}$$

$$X_{linear} = A_x \cdot X_{in} \quad \text{Equation 2-6}$$

$$X_{ucurve} = (1-C_x) \cdot X_{in}^2 + C_x \cdot X_{in} \quad \text{Equation 2-7}$$

$$X_{lcurve} = (E_x - D_x) \cdot X_{in}^2 + D_x \cdot X_{in} \quad \text{Equation 2-8}$$

The parameters are read into the memory, and it is determined, using parameter fitting for example, which of $X_{lcurve}$ and $X_{ucurve}$ is appropriate for $X_{linear}$. Then, $X_{linear}$ is connected to one of the curves.

Note that the parameter shown below is generated automatically in the white correction circuit by using the magnification ($A_x$).

[Expression 10]

$$E_x = \{A_x(A_x \geq 0)^{1(A_x < 0)} \quad \text{Equation 2-9}$$

Figure 3B:
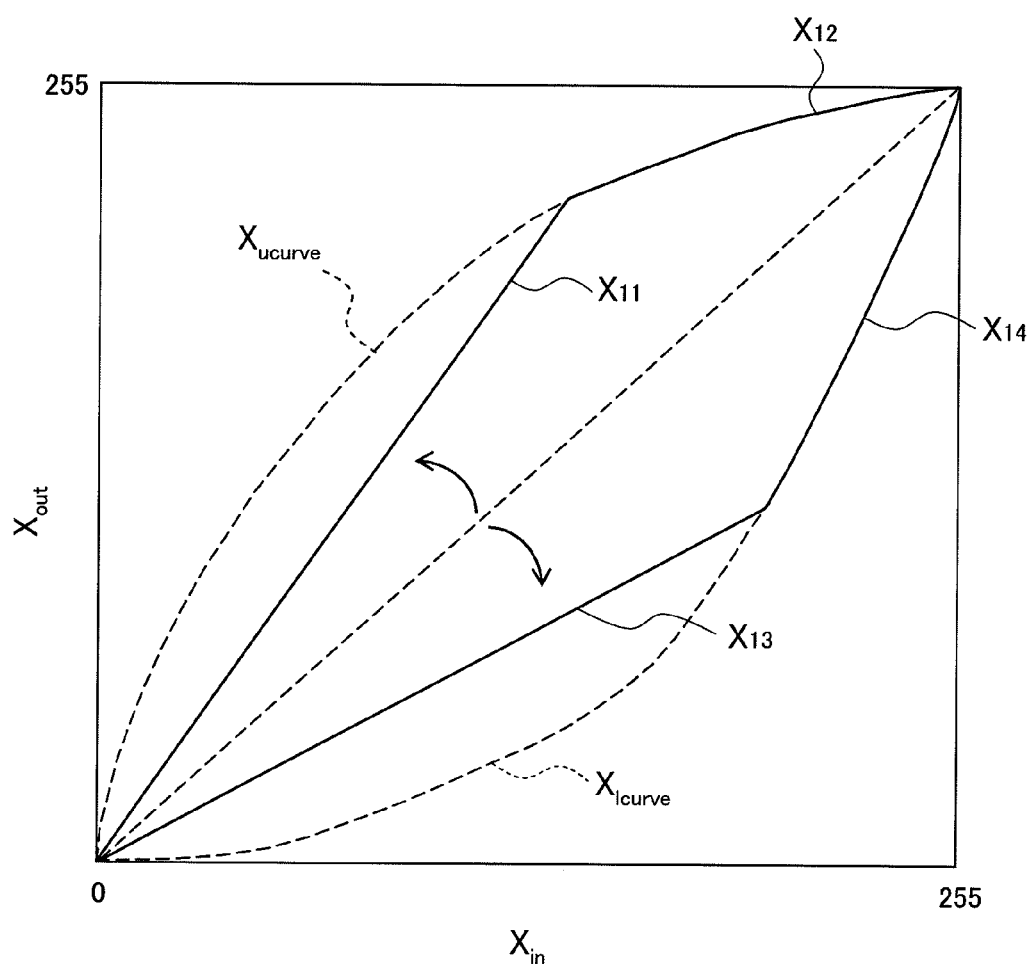
FIG. 3B is a diagram showing how to determine which of $X_{lcurve}$ and $X_{ucurve}$ is suitable for $X_{linear}$.

FIG. 3B is a diagram showing how it is determined which of $X_{lcurve}$ and $X_{ucurve}$ is appropriate for $X_{linear}$. The present embodiment is characterized in that the correction coefficients are adjusted so that the luminance of an input video image of the white correction circuit may match the luminance of an output video image thereof. Thereby, components are divided into ones with a correction coefficient of 1 or larger and ones with a correction coefficient smaller than 1. Then, in the first embodiment, for a component with a correction coefficient of 1 or larger (e.g., L11), $X_{linear}$ showing an input-output characteristic in the practical luminance range is smoothly connected to $X_{ucurve}$ showing an input-output characteristic in a luminance range exceeding the practical luminance range, as shown in FIG. 3B. In the second embodiment, on the other hand, since each component is classified into one with a correction coefficient of 1 or larger, or one with a correction coefficient smaller than 1, a curve to be connected thereto in the range exceeding the practical luminance range may need to be changed depending on the components. In other words, $X_{ucurve}$ which is a quadratic curve curving upward (X12) is smoothly connected to the straight line X11 representing a component with a correction coefficient of 1 or larger. $X_{lcurve}$ which is a quadratic curve curving downward (X14) is smoothly connected to the straight line X13 representing a component with a correction coefficient smaller than 1. In this way, whether to connect to an upward curve or to connect to a downward curve is determined depending on whether the correction coefficient is 1 or larger, or smaller than 1. Note that, if the correction coefficient is in a range almost close to 1, the straight line need to be connected to neither of the curves by using the correction coefficient as it is. Which of a downward curve and an upward curve to connect is preferably predetermined based on how much the correction coefficient is away from 1.

As described thus far, the present embodiment has an advantage that, because the process of raising an input-output characteristic so that the output reaches the maximum value when the input is at the maximum is performed by connecting a downward curve to a straight line with a correction coefficient smaller than 1, the display can be made smooth while maintaining high luminance.

Figure 4A:
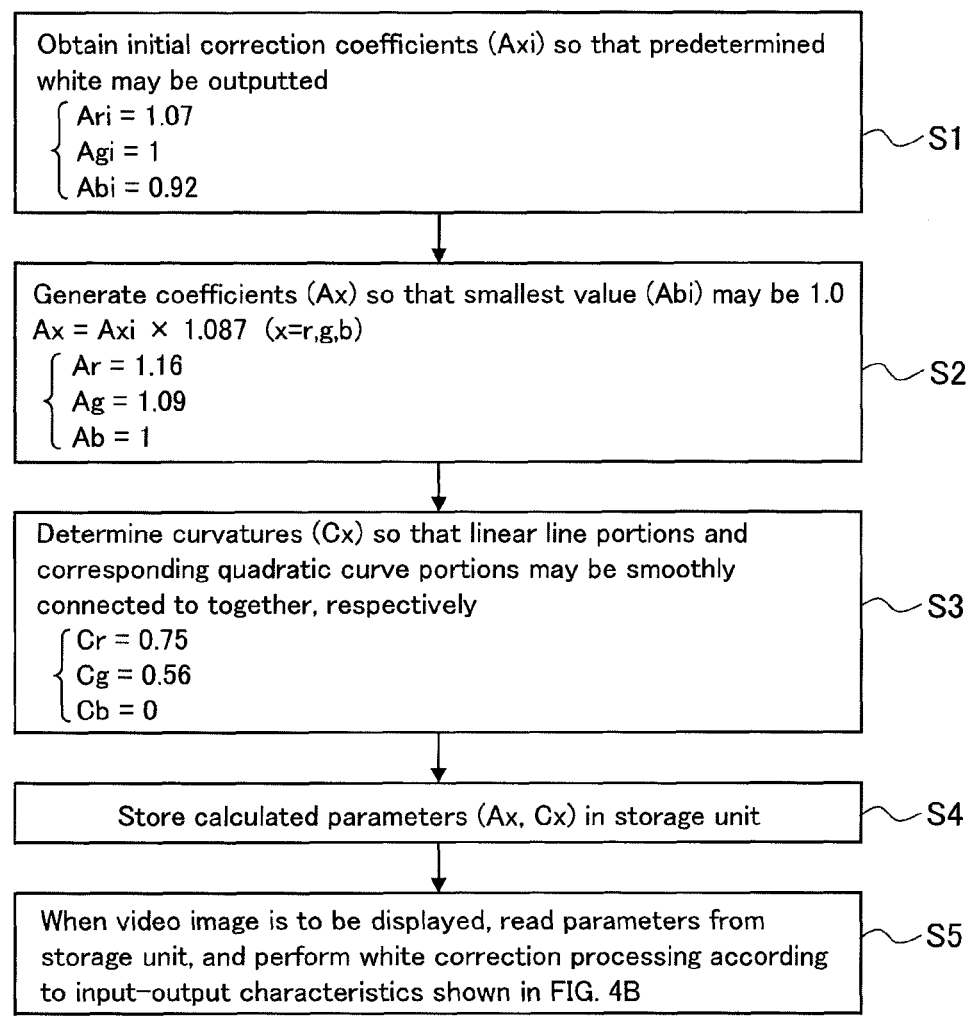
FIG. 4A is a diagram showing a concrete example of an image processing technique according to the first embodiment of the present invention.
Figure 4B:
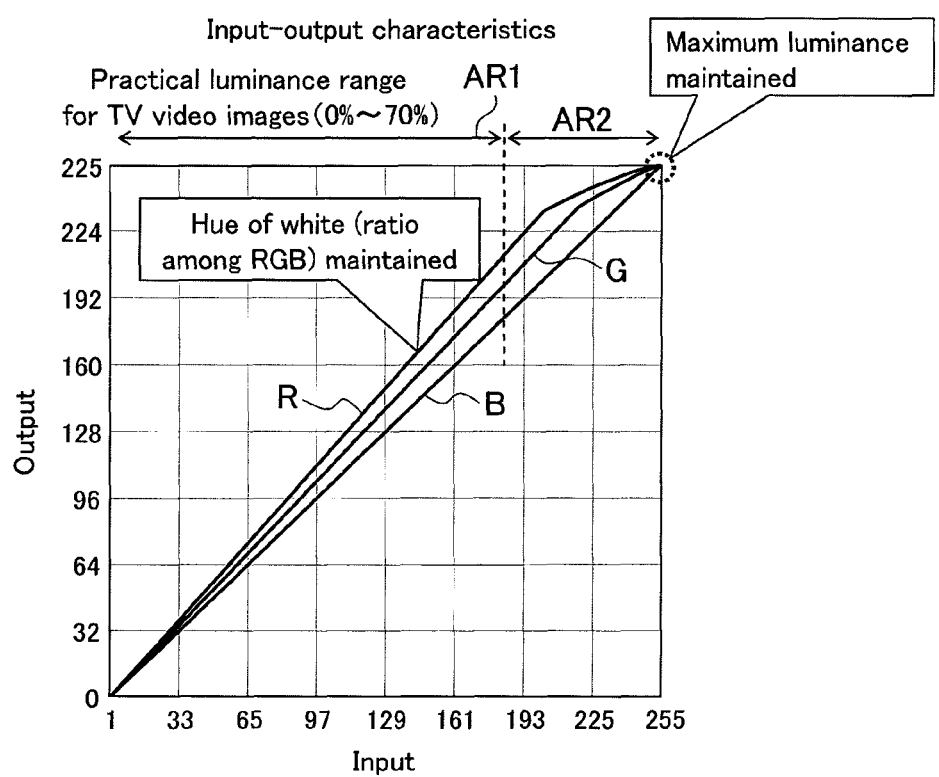
FIG. 4B is a diagram showing the concrete example of the image processing technique according to the first embodiment of the present invention.

A complementary, concrete description is given below of the image processing technique according to the first and second embodiments. FIGS. 4A and 4B are diagrams showing a concrete example of the image processing technique according to the first embodiment of the present invention.

As FIG. 4A shows, first in Step S1, initial correction values (initial correction coefficients) coefficients ($A_{xi}$) are obtained for the purpose of outputting predetermined white. x in each initial correction coefficient ($A_{xi}$) is any of R, G and B. For example, when the image processing technique according to the embodiment is employed in a production line or the like, arrangements are made in order that output of predetermined white can be secured by beforehand connecting a product, such as a mobile phone, to which the present invention is applied, to a measurement instrument, such as a colorimeter, in the production line, in shipment preparation, or the like. For example, as shown in FIG. 4A, $A_{ri}$=1.07, $A_{gi}$=1, and $A_{bi}$=0.92 are obtained as the initial correction coefficients. Next, in Step S2, since the initial correction coefficient of B is the smallest here, coefficients ($A_x$) are generated so that the smallest value ($A_{bi}$) may be 1.0.

Specifically, arithmetic is performed on $A_x=A_{xi} \times 1.087$ (x=r, g, b). The controller performs this processing.

$A_r$=1.16
$A_g$=1.09
$A_b$=1

In this way, the arithmetic is performed so that $A_b$ may be "1." As described above, the RGB correction values can be set up in a way that the ratio among the RGB correction values is substantially equal to the ratio among the RGB initial correction coefficients. Note that: the ratio among RGB only needs to be substantially equal to that among the RGB initial correction coefficients; and approximate, round values, for example, Ar=1.15, Ag=1.10, Ab=1.00 may be used.

Next, curvatures ($C_x$) are determined for the purpose of smoothly connecting the straight line portion with the quadratic curve portion (Step S3). This processing can be performed using parameter fitting, for example.

$C_r$=0.75
$C_g$=0.56
$C_b$=0

In Step S4, the parameters ($A_x$, $C_x$) thus calculated are stored in the storage unit.

Next, as shown in Step S5, when a video image is to be displayed, the parameters thus stored are read from the storage unit, and white correction processing is performed based on the input-output characteristics shown in FIG. 4B. Here, B is set up in a way that the correction coefficient $A_b$=1 in an input luminance range up to 255, and accordingly the correction coefficient of B is set at 1 in the entire luminance range. Consequently, $A_r$=1.16 and $A_g$=1.09, which makes R and G saturated in the high luminance range. Then, in Step S5, as shown in FIG. 4B, B is represented by a linear line in the entire luminance range (including a practical luminance range AR1 and a high luminance range AR2), whereas a quadratic curve having a curvature of $C_r$=0.75 and a quadratic curve having a curvature of $C_g$=0.56 are smoothly connected to the linear curves representing R and G, respectively, in the high luminance range AR2 exceeding the normal use range, namely, AR1. Thereby, the hue of white (the ratio among RGB) is maintained in the practical luminance range for television video images (AR1: 0 to 70%). Moreover, in high luminance in the high luminance range (AR2) exceeding the practical luminance range, the luminance can be maintained so as to be able to meet a request such as brightening a menu screen or watching TV on a brighter television screen. Further, white display can have continuity even at the joint between AR1 and AR2.

Figure 5A:
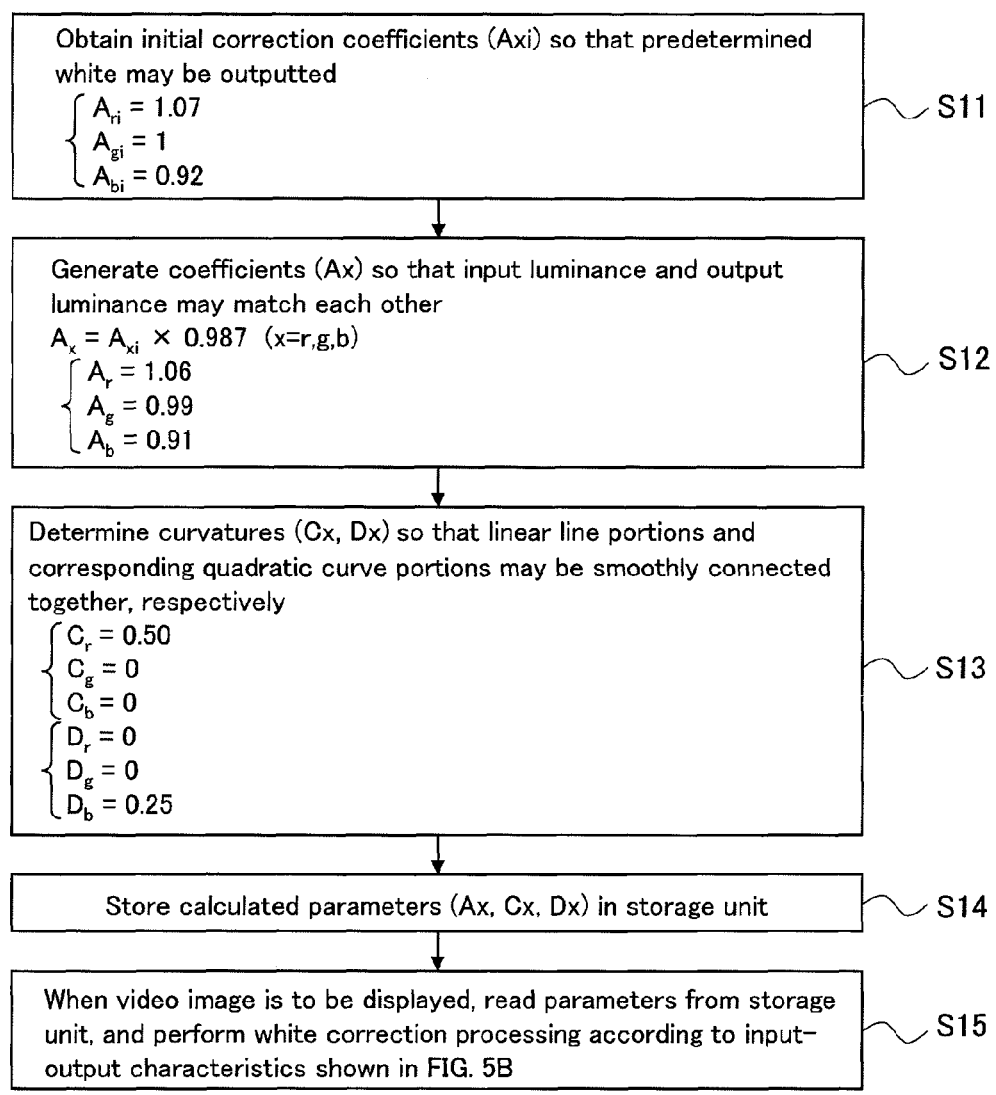
FIG. 5A is a concrete diagram showing an example of correction according to the second embodiment of the present invention.
Figure 5B:
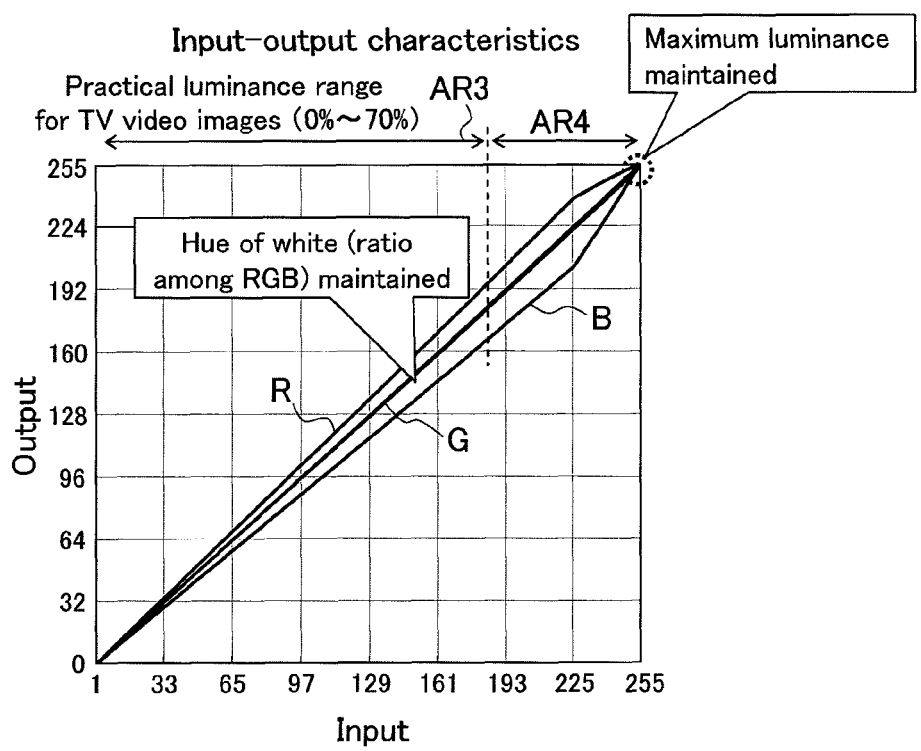
FIG. 5B is a concrete diagram showing the example of the correction according to the second embodiment of the present invention.

FIGS. 5A and 5B are concrete drawings showing an example of correction according to the second embodiment. In the second embodiment, first in Step S11, initial correction coefficients ($A_{xi}$) are obtained for the purpose of outputting predetermined white. This processing is performed in a production line or the like by connecting a measurement instrument to a product to which the present invention is applied.

$A_{ri}$=1.07
$A_{gi}$=1
$A_{bi}$=0.92

Coefficients ($A_x$) are generated so that the input luminance and the output luminance to match each other. The controller performs this processing (Step S12). Note that the correction coefficient of G is almost "1" here.

$A_x=A_{xi} \times 0.987$ (x=r, g, b)
$A_r$=1.06
$A_g$=0.99
$A_b$=0.91

Curvatures ($C_x$, $D_x$) are determined using, for example, parameter fitting for the purpose of smoothly connecting the straight line portions and the quadratic curve portions (Step S13). This processing, too, is performed by the controller.

$C_r$=0.50
$C_g$=0
$C_b$=0
$D_r$=0
$D_g$=0
$D_b$=0.25

The parameters ($A_x$, $C_x$, $D_x$) thus calculated are stored in the storage unit (Step S14). Next, when a video image is to be displayed, the parameters are read from the storage unit to perform white correction processing based on the input-output characteristics shown in FIG. 5B. Note that G can be represented with an almost straight line here in the entire luminance range (including a practical luminance range AR3 and a high luminance range AR4), which means that the brightness of an original video image is reproducible, thus facilitating processing. For R with a correction coefficient larger than 1, the high luminance range is represented by smoothly connecting a quadratic curve curving upward to a linear line representing R. For B with a correction coefficient smaller than 1, the high luminance range is represented by smoothly connecting a quadratic curve curving downward to a linear line representing B. The correcting of R, G and B using a linear line, a quadratic curve curing upward and a quadratic curve curving downward in this manner has an advantage that the luminance can be maintained while color adjustment of white is achieved with a good balance by using G as a benchmark.

Next, a description is given of examples of how to implement the image processing according to the first embodiment and the image processing according to the second embodiment by using hardware (circuitry).

[Expression 11]

$$X_{out} = \min(X_{linear}, X_{ucurve}) \quad \text{Equation 1-4}$$

$$X_{linear} = A_x * X_{in} \quad \text{Equation 1-5}$$

$$X_{ucurve} = (1-C_x) \cdot X_{in}^2 + C_x \cdot X_{in} \quad \text{Equation 1-6}$$

Figure 6:
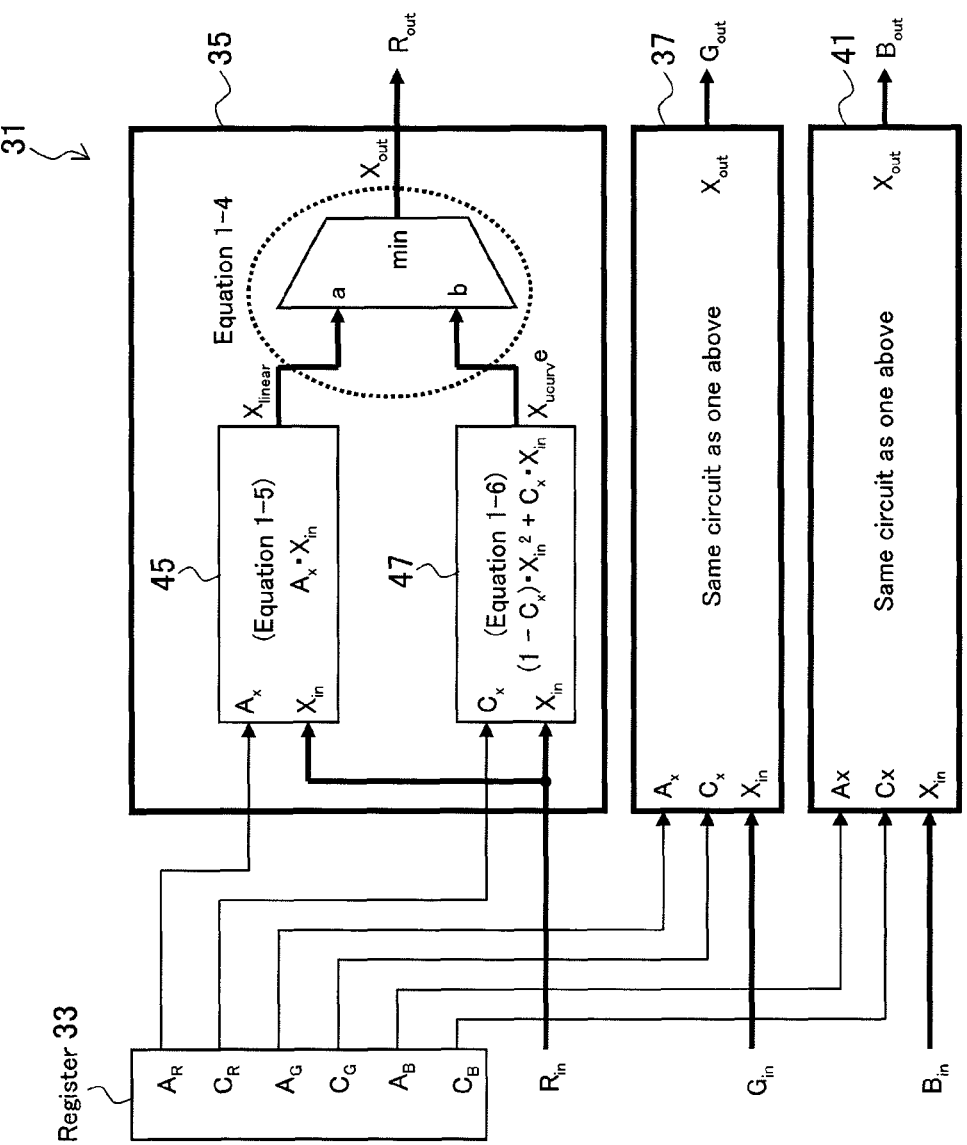
FIG. 6 is a diagram showing an example of implementing the image processing technique according to the first embodiment by using a circuit.

FIG. 6 is a diagram showing an example of implementation of the image processing technique according to the first embodiment of the present invention by use of a circuit. A video signal processing circuit 31 includes: a register 33 configured to temporarily fetch magnifications and curvatures for the respective colors, namely, $A_R$, $C_R$, $A_G$, $C_G$, $A_B$, and $C_B$, stored in the storage unit; first arithmetic circuits 45 each configured to receive the correction coefficient $A_x$ out of the outputs from the register 33 and a video input $X_{in}$ ($R_{in}$, $G_{in}$, $B_{in}$), as well as thus to obtain $X_{linear}$ for its corresponding color by performing arithmetic using Equation (1-5) given above; second arithmetic circuits 47 each configured to receive the curvature $C_x$ out of the outputs from the register 33 and the video input $X_{in}$ ($R_{in}$, $G_{in}$, $B_{in}$), as well as thus to obtain $X_{ucurve}$ for its corresponding color by performing arithmetic using Equation (1-6) given above; a first image processing circuit 35 configured to output, as $X_{out}$, the smaller one of the output $X_{linear}$ of the first arithmetic circuit 45 and the output $X_{ucurve}$ of the second arithmetic circuit 47 by using Equation (1-6) given above (here, obtaining $X_{out}$ when x=R); a second image processing circuit 37 configured to obtain $X_{out}$ for G in the same manner; and a third image processing circuit 41 configured to obtain $X_{out}$ for B in the same manner. The image processing described in the first embodiment can be implemented with a hardware configuration of such a relatively-simple circuit.

[Expression 12])

$$(X_{out} = \min(\max(X_{linear}, X_{lcurve}), X_{ucurve}) \quad \text{Equation 2-5}$$

$$X_{linear} = A_x * X_{in} \quad \text{Equation 2-6}$$

$$X_{ucurve} = (1-C_x) \cdot X_{in}^2 + C_x \cdot X_{in} \quad \text{Equation 2-7}$$

$$X_{lcurve} = (E_x - D_x) \cdot X_{in}^2 + D_x \cdot X_{in} \quad \text{Equation 2-8}$$

$$E_x = \{A_x(A_x \geq 0)\,\, 1(A_x < 0)\} \quad \text{Equation 2-9}$$

Figure 7:
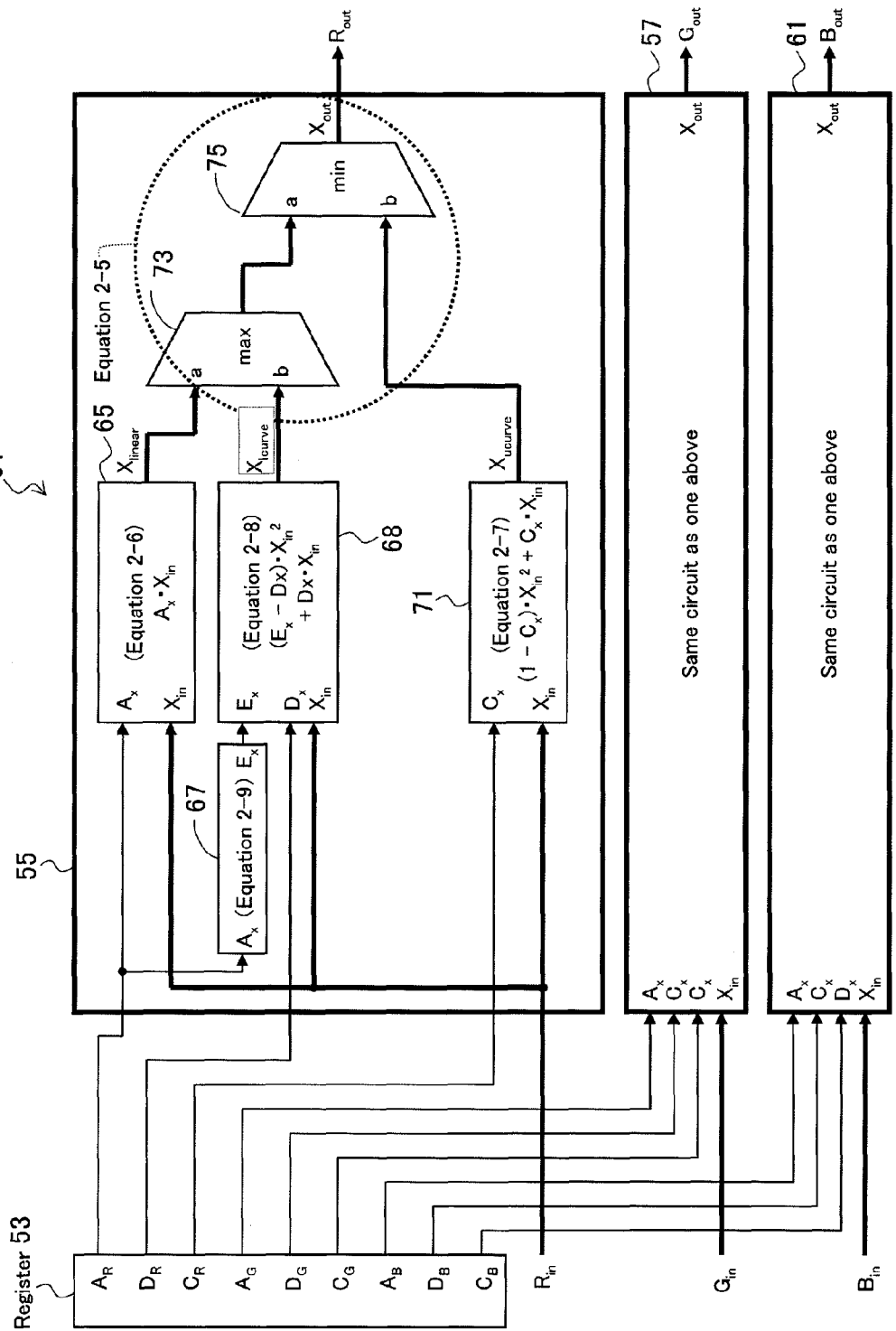
FIG. 7 is a diagram showing an example of implementing the image processing technique according to the second embodiment by using a circuit.

FIG. 7 is a diagram showing an example of implementation of the image processing technique according to the second embodiment of the present invention by use of a circuit. A video signal processing circuit 51 includes: a register 53 configured to temporarily fetch magnifications and curvatures for the respective colors, namely, $A_R$, $C_R$, $D_R$, $A_G$, $C_G$, $D_G$, $A_B$, $C_B$, and $D_B$, stored in the storage unit; first arithmetic circuits 65 each configured to receive the correction coefficient $A_x$ out of the outputs from the register 53 and a video input $X_{in}$ ($R_{in}$, $G_{in}$, $B_{in}$), as well as thus to obtain $X_{linear}$ for its corresponding color by performing arithmetic using Equation (2-6) given above; second arithmetic circuits 68 each configured to obtain $E_x$ from $A_x$ using Equation (2-9) given above, to receive $E_x$ thus obtained, the curvature $D_x$ out of the outputs from the register 53, and the video input $X_{in}$ ($R_{in}$, $G_{in}$, $B_{in}$), as well as thus to obtain $X_{lcurve}$ for its corresponding color by performing arithmetic using Equation (2-8) given above; circuits 73 each configured to output the larger one of the output $X_{linear}$ of the first arithmetic circuit 65 and the output $X_{lcurve}$ of the second arithmetic circuit 67; third arithmetic circuits 71 each configured to receive $C_x$ and $X_{in}$, as well as thus to output $X_{ucurve}$ by performing arithmetic according to Equation (2-7) given above; a circuit 75 configured to receive the output of the circuit 73 and the output $X_{ucurve}$ of the third computation circuit 71, as well as thus to output, as $X_{out}$ ($R_{out}$ here), the smaller one of the output of the circuit 73 and $X_{ucurve}$ by using Equation (2-5) (to output $R_{out}$ in this case); a circuit 57 configured to perform similar processing for G, and thus to output $G_{out}$; and a circuit 61 configured to output $B_{out}$. The arithmetic according to the second embodiment can be implemented by hardware using the circuit 51.

Figure 8:
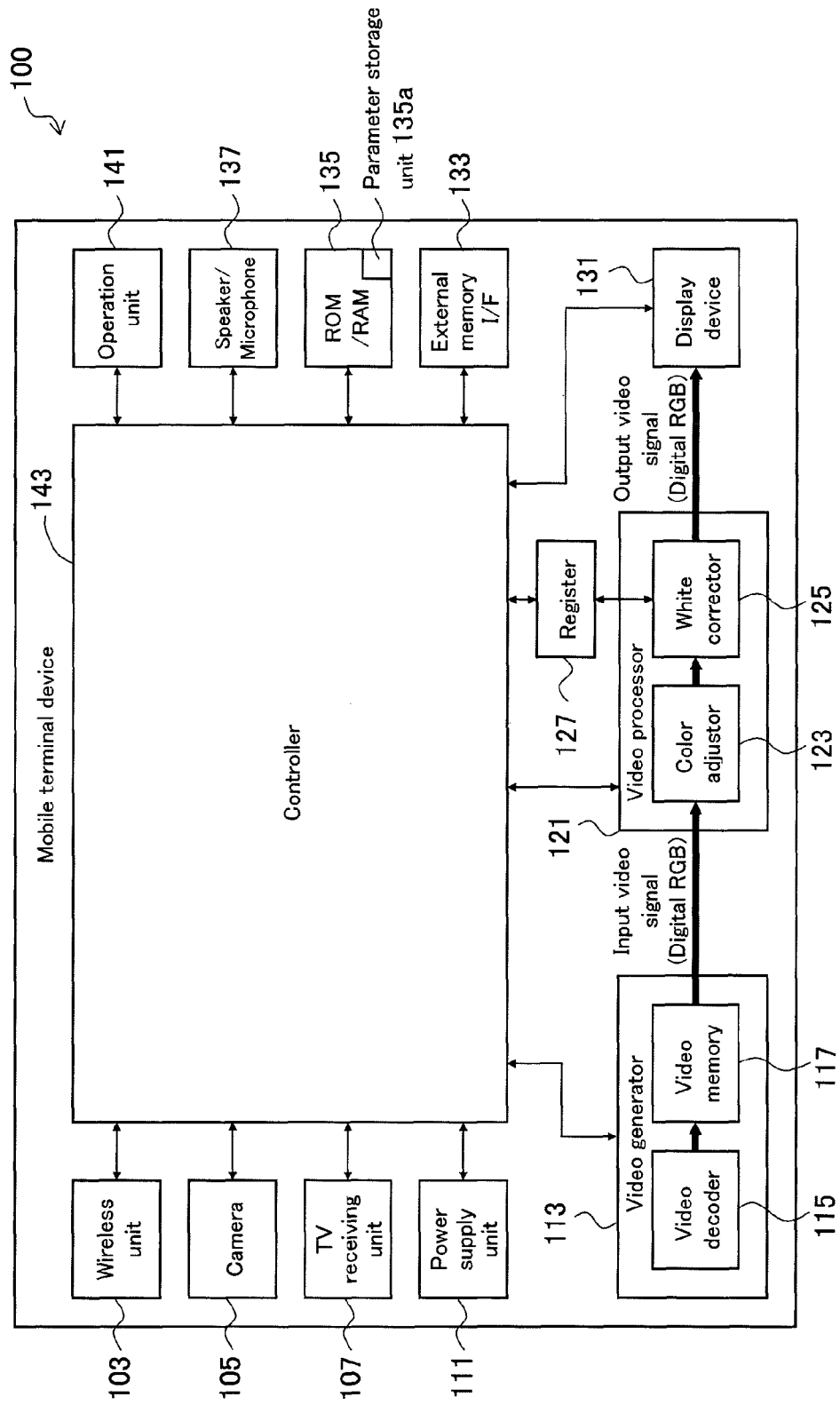
FIG. 8 is a functional block diagram showing a configuration example of a mobile terminal having the video signal processing circuit according to the first and second embodiments of the present invention.

Next, a description is given of an example where the video signal circuit according to the first or second embodiment is applied to a mobile terminal. FIG. 8 is a functional block diagram showing a configuration example of a mobile terminal having the video signal processing circuit according to the first and second embodiments of the present invention. As FIG. 8 shows, a mobile terminal 100 used in the present embodiments includes: a wireless unit 103 configured to perform wireless communications; a camera 105; a television receiving unit (TV receiving unit) 107; a power supply unit 111 having a battery; a video generator 113; a video (image) processor 121; a register 127, an LCD display device 131, an interface unit 133 for an external memory; a memory unit 135 including ROM/RAM; an audio output unit such as a speaker/microphone 137; an operation unit 141; and a controller (CPU) 143 for overall control. Note that: not all of these constituents are essential; and other constituents may be included. The video generator 113 includes a video decoder 115 and a video memory 117. The video (image) processor 121 includes a color adjustor 123 and a white corrector 125 for images acquired from the wireless unit 103, the camera 105, the TV receiving unit 107, the external memory, or the like. The memory unit 135 is provided with a parameter storage unit 135a for storing the parameters described above. An input video signal (digital RGB) outputted from the video generator 113 is inputted to the color adjustor 123. Next, the color corrector which is the characteristic of the present embodiments outputs, to the display device 131, an output video signal (digital RGB) obtained through correction based on the parameters temporarily fetched to the register 127 from the parameter storage unit 135a. Whether to perform white correction may be determined depending on whether the video is acquired from the wireless unit 103, from the camera 105, or from the TV receiving unit 107.

Figure 9:
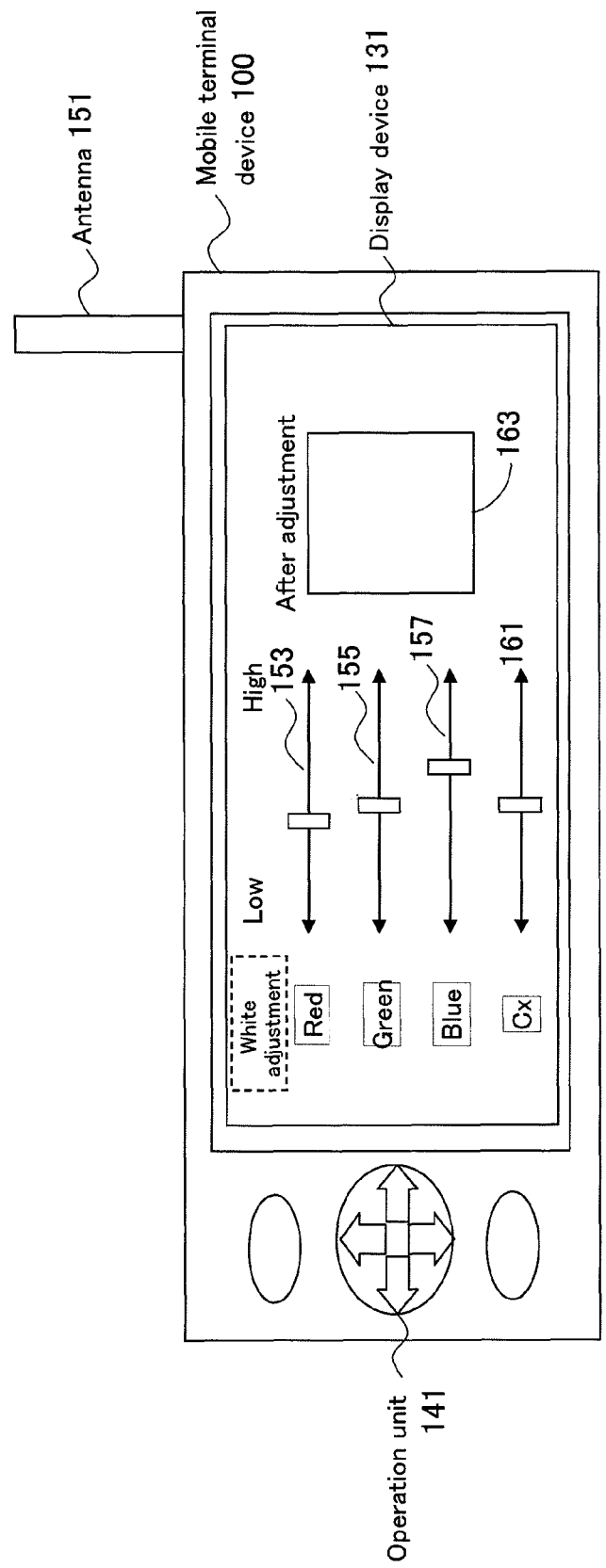
FIG. 9 is a diagram showing a configuration example of the external appearance of the mobile terminal shown in FIG. 8, the diagram showing the display device side.

FIG. 9 is a diagram showing a configuration example of the external appearance of the mobile terminal 100 shown in FIG. 8, the diagram showing the display device 131 side. The mobile terminal 100 includes: the operation unit 141 and an antenna 151. In this example, setting values for white correction are designed to be capable of being changed through the operation unit 141 by use of sliding bars 153, 155, 157, 161, and the like displayed on the display device 131. A display unit 163 on which an adjusted video image can be checked is provided. The correction value $A_R$ for red (R) is adjustable with the sliding bar 153. Similarly, the correction value $A_G$ for green (G) is adjustable with the sliding bar 155, and the correction value $A_B$ for blue (B) is adjustable with the sliding bar 157. Further, the curvature $C_x$ may be designed to be adjustable with the sliding bar 161. Note that these user operations through the sliding bars aim at further adjusting the correction values, and can be considered as white adjustment. Note that it is preferable that the correction values and adjustment values obtained by the user be stored and managed separately from each other. The correction values are considered as being those for the mobile terminal, whereas the adjustment values are considered as being those for content. Accordingly, the adjustment values are preferably stored in association with the content.

Figure 10:
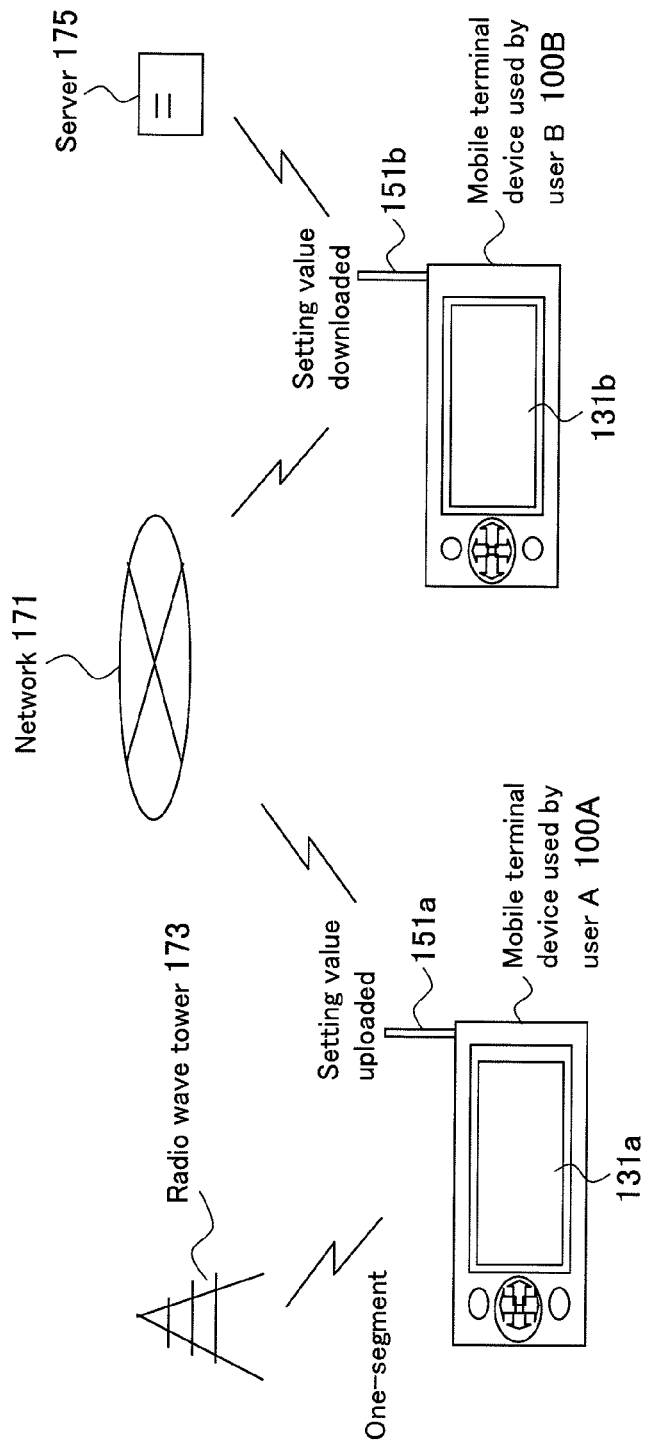
FIG. 10 is a diagram showing a usage example of the mobile terminal according to the embodiments.

FIG. 10 is a diagram showing a usage example of the mobile terminal according to the present embodiment. As FIG. 10 shows, in this usage example, multiple (two in this example in the diagram) mobile terminals, namely a mobile terminal 100A (a mobile terminal used by a user A) and a mobile terminal 100B (a mobile terminal used by a user B) are set up. The mobile terminal 100A includes a display unit 131a and an antenna 151a, and the mobile terminal 100B includes a display unit 131b and an antenna 151b. In FIG. 10, the mobile terminal 100A receives one-segment broadcasting from a radio wave tower 173. The mobile terminal 100B is connected to a server 175. Further, the mobile terminal 100A and the mobile terminal 100B are connected together through a network 171.

In this respect, the setting values, such as the correction coefficients, of the mobile terminal 100A can be sent to the mobile terminal 100B through the network 171, thus allowing the mobile terminal 100B to use the setting values. Thereby, the users can share their settings between themselves. In other words, the users can share the adjustment values obtained by one user through deduction of the correction values for white variance in the display device 131a, and the adjustment values obtained by the other user through deduction of the correction values for white variance in the display 131b, which have been described referring to FIG. 9.

Moreover, broadcasting data (e.g., one-segment content itself) may be given the setting values. Further, the setting values may be used by being downloaded through the server 175. In this way, parameters combining the adjustment values that match the video content to be displayed and the white variance correction values may be set in the register of the white correction unit 125 (FIG. 8).

Figure 11:
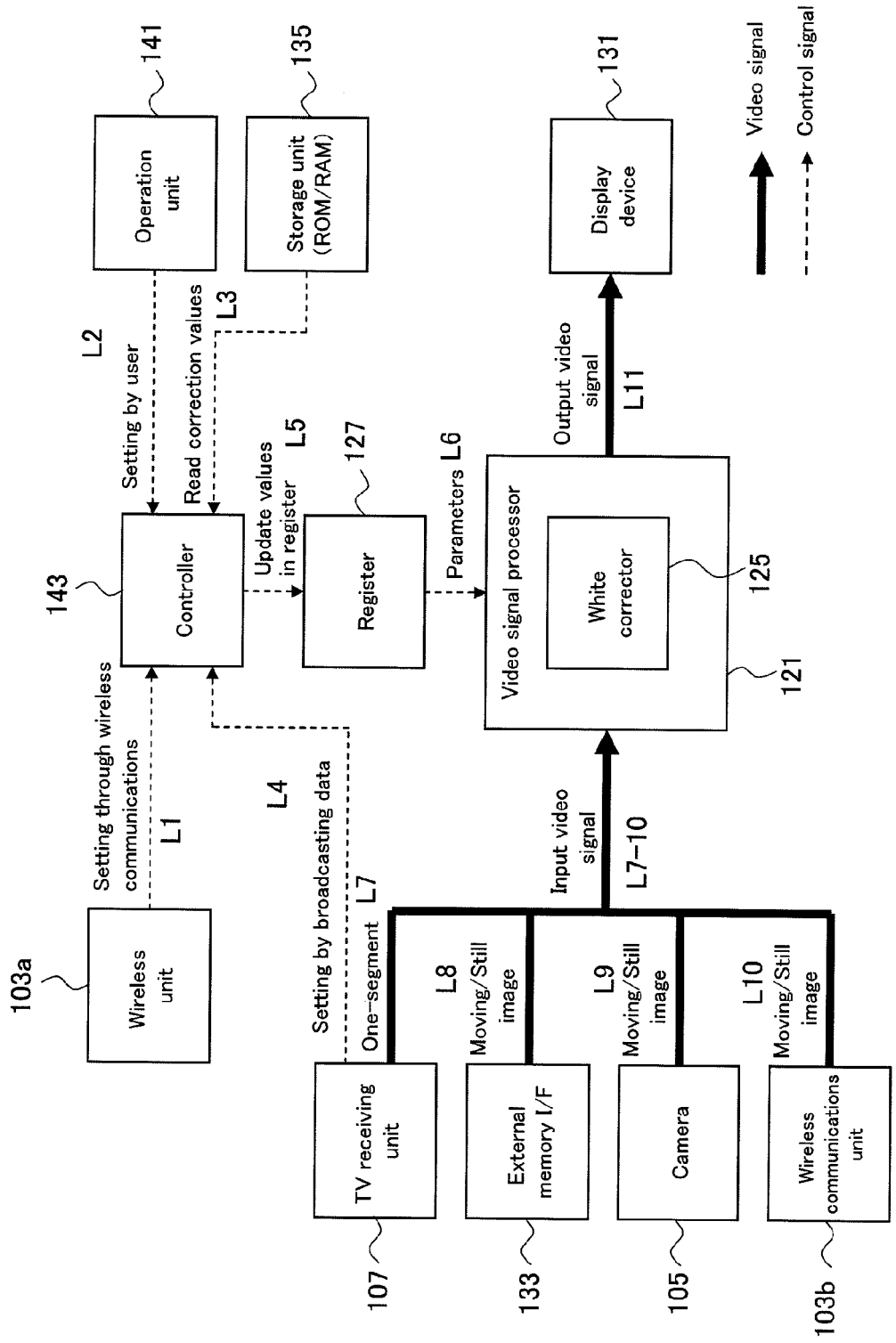
FIG. 11 is a diagram of relationships among the functions in a video signal processor, which centers on a white corrector.

FIG. 11 is a diagram of relationships among the functions in the video signal processor 121, which center on the white corrector 125. A description is given centering on the video signal processor 121 having the white corrector 125 as FIG. 11 shows. First, correction values are read from the storage unit (ROM/RAM) 135 to the controller 143 (L3). As described earlier, in addition to them, parameter setting values L1 acquired through wireless communications are sent from a wireless unit 103a to the controller (CPU) 143 as well. In addition, parameter setting values L2 set up by the user, which are inputted, are sent from the operation unit 141 to the controller (CPU) 143. Further, settings (L4) are made based on broadcasting data L4 from the TV receiving unit 107 as well. The controller 143 temporarily sets the parameter setting values in the resister 127 (L5). The parameters stored in the register are sent to the video signal processor 121 (L6). Meanwhile, as to the video signal itself, one-segment L7 from the TV receptor 107, a moving/still image L8 from the external memory I/F memory 133, a moving/still image L9 from the camera 105, or a moving/still image L10 from a wireless communication unit 103b is inputted to the video signal processor 121 as an input video signal L7-10. Then, white correction and the like are performed by the white corrector 125 using the above-described parameters L10. An output video signal L11 thus obtained is outputted to the display device 131, and the video is displayed.

Figure 12:
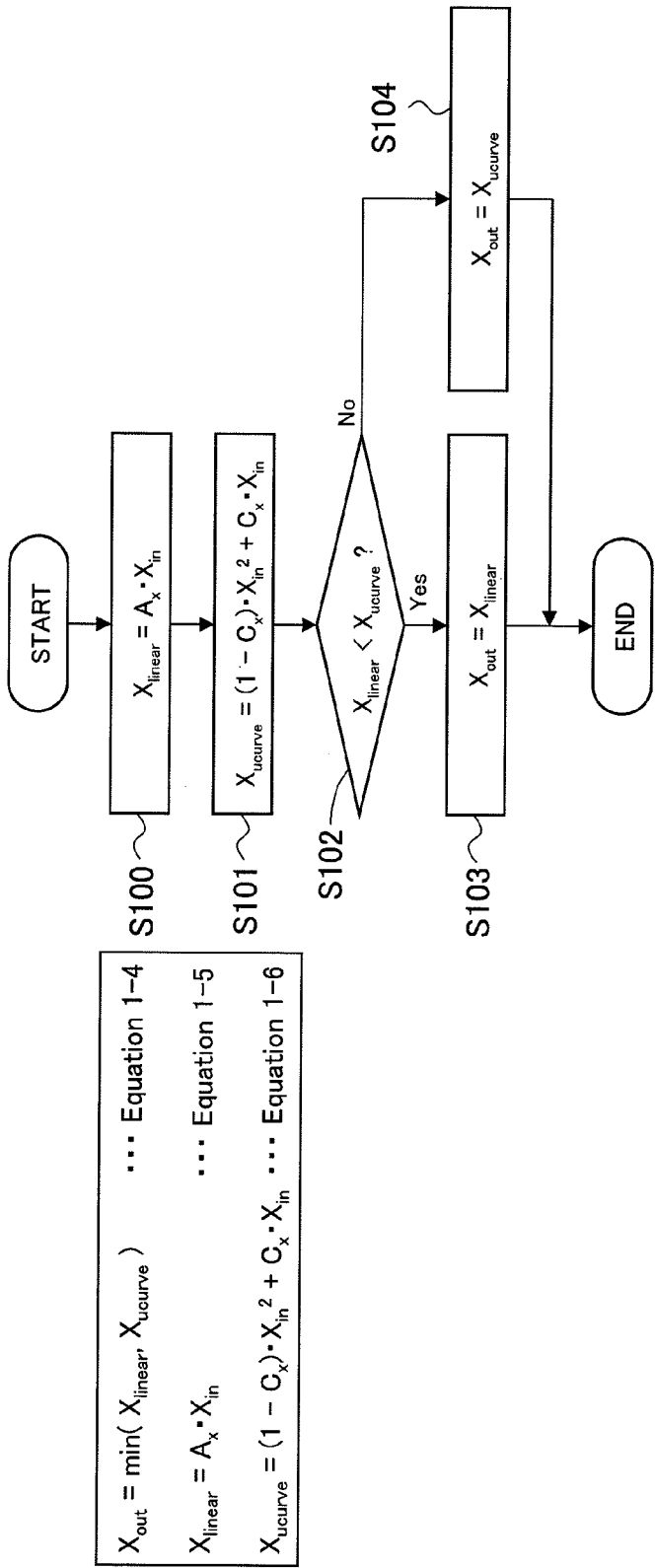
FIG. 12 is a diagram showing a flow of processing, directly by software, the functions of the hardware configuration (circuit) of one of the image processing techniques according to the embodiments of the present invention, namely, the functions of the hardware configuration (circuit) according to the first embodiment shown in FIG. 6.

Next, FIG. 12 shows a flow of processing, directly by software, the functions of the hardware configuration (circuit) of one of the image processing techniques according to the embodiments of the present invention, namely, the functions of the hardware configuration (circuit) according to the first embodiment shown in FIG. 6. Calculation equations used in the processing shown in the flowchart of FIG. 12 are shown on the top left of FIG. 12. First, the processing starts (START), and in Step S100, arithmetic is performed on $X_{linear}=A_x \cdot X_{in}$ for each of RGB. Next, in Step S101, arithmetic is performed on $X_{ucurve}=(1-C_x) \cdot X_{in}^2 + C_x \cdot X_{in}$. In Step S102, $X_{linear}$ and $X_{ucurve}$ are compared in their magnitudes. If $X_{linear} < X_{ucurve}$ (YES), the processing proceeds to Step S103, where arithmetic is performed as $X_{out}=X_{linear}$, and a corresponding signal is outputted to the display device. If NO, arithmetic is performed as $X_{out}=X_{ucurve}$ in Step S104, and a corresponding signal is outputted to the display device. With this, the processing ends (END).

Figure 13:
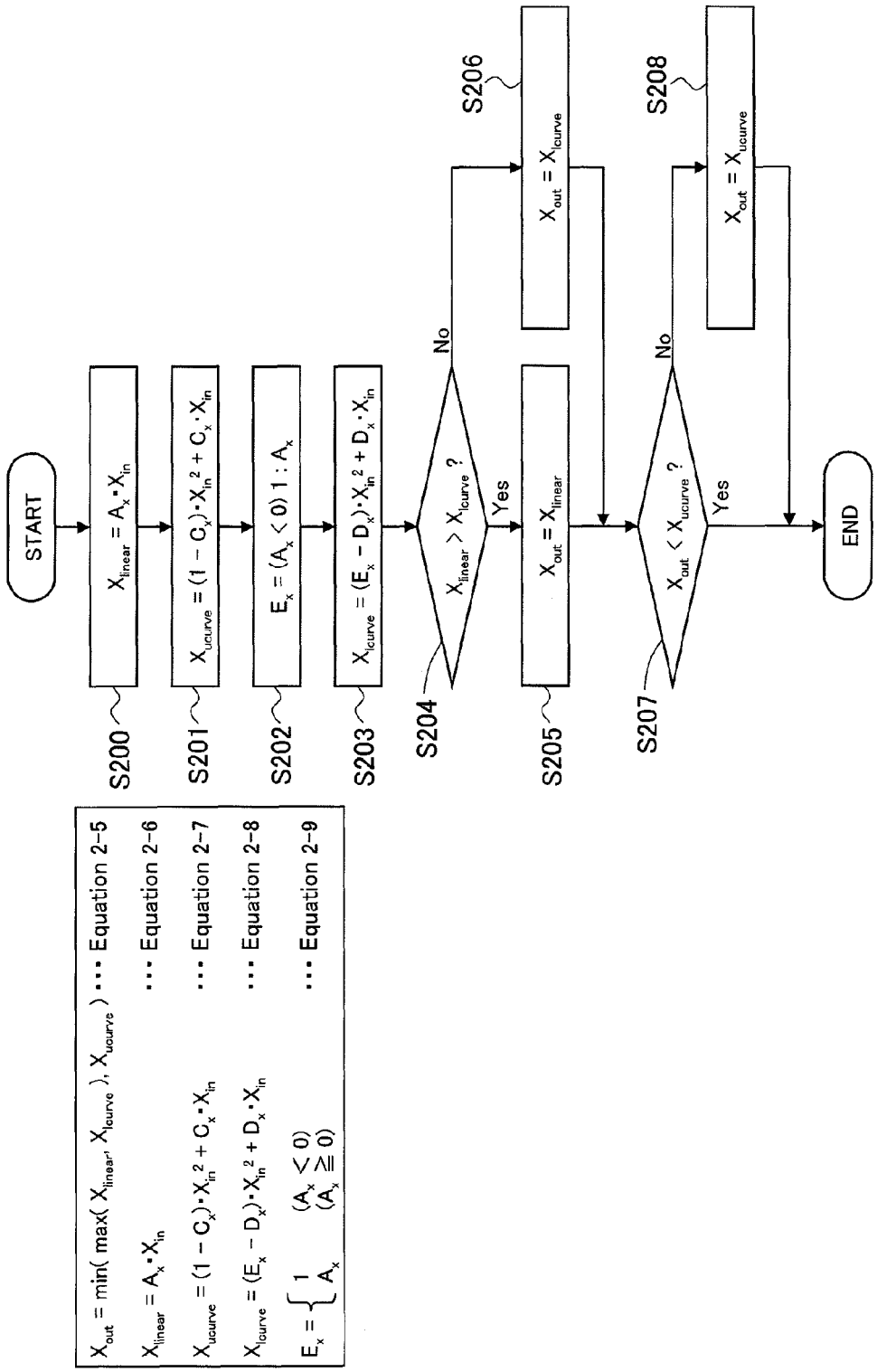
FIG. 13 is a diagram showing a flow of processing, directly by software, the functions of the hardware configuration (circuit) of one of the image processing techniques according to the embodiments of the present invention, namely, the functions of the hardware configuration (circuit) according to the second embodiment shown in FIG. 7.

Next, FIG. 13 shows a flow of processing, directly by software, the functions of the hardware configuration (circuit) of one of the image processing techniques according to the embodiments of the present invention, namely, the functions of the hardware configuration (circuit) according to the second embodiment shown in FIG. 7. As FIG. 3 shows, the processing starts (START), and in Step S200, arithmetic is performed on $X_{linear}=A_x \cdot X_{in}$ for each of RGB. Next, in Step S201, arithmetic is performed on $X_{ucurve}=(1-C_x) \cdot X_{in}^2 + C_x \cdot X_{in}$. In Step S202, $E_x$ is obtained as $E_x=1$ ($A_x < 0$) and $E_x=A_x$ ($A_x \geq 0$). In Step S203, arithmetic is performed on $X_{lcurve}=(E_x-D_x) \cdot X_{in}^2 + D_x \cdot X_{in}$.

If YES in Step S204, the processing proceeds to Step S205, where $X_{out}=X_{linear}$ is obtained. If NO in Step S204, the processing proceeds to Step S206, where $X_{out}=X_{lcurve}$ is obtained.

Next, in Step S207, whether $X_{out} < X_{ucurve}$ or not is determined. If YES, the processing ends (a signal is outputted). If NO, $X_{out}=X_{ucurve}$ is obtained, and the processing ends (a signal is outputted).

As described above, the image processing techniques according to the present embodiments can be performed by either the hardware configuration or the software configuration.

The software processing described above is an example of software processing according to a hardware configuration.

Figure 14:
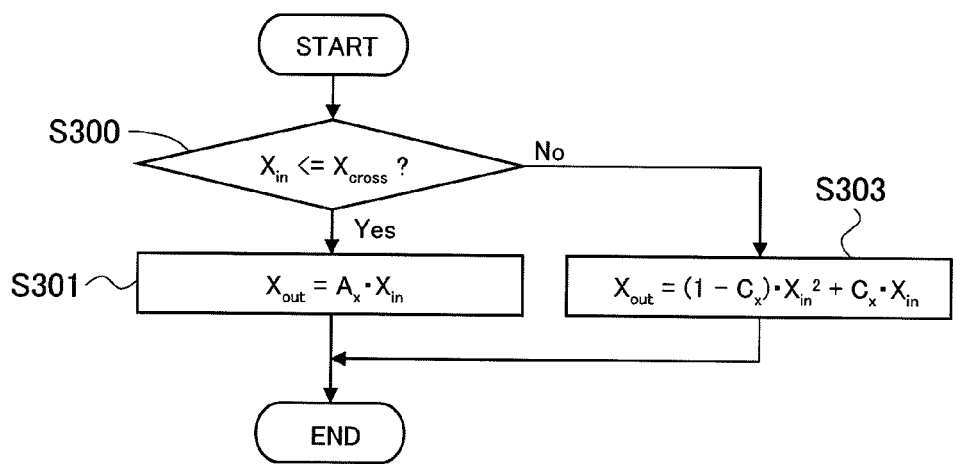
FIG. 14 is a flowchart optimized for software processing for performing the image processing technique according to the first embodiment.

Next, processing suitable for software processing is described. FIG. 14 is a flowchart optimized for software process for performing the image processing technique according to the first embodiment. A cross-point ($X_{cross}$) between $X_{linear}$ and $X_{ucurve}$ is obtained in advance (before performing the flowchart shown in FIG. 14). The cross-point ($X_{cross}$) may be designed to be stored in the above-described storage unit, and to be read before the execution. The cross-point ($X_{cross}$) is obtained as $X_{in}$ at which $X_{linear}=X_{ucurve}$ by use of Equation (1-5) and Equation (1-6) given earlier. To be more specific, the cross-point ($X_{cross}$) is obtained as follows.

$$A_x \cdot X_{cross}=(1-C_x) \cdot X_{cross}^2 + C_x \cdot X_{cross}$$

$$(1-C_x) \cdot X_{cross}^2 + (C_x-A_x) \cdot X_{cross}=0$$

$$(1-C_x) \cdot X_{cross}=-(C_x-A_x)$$

Thus, the cross-point is obtained as $X_{cross}=(A_x-C_x)/(1-C_x)$.

More specifically, as shown in FIG. 14, once the processing starts (START), whether $X_{in} \leq X_{cross}$ or not is determined in Step S300. If YES, the processing proceeds to Step S301, where arithmetic is performed on $X_{out}=A_x \cdot X_{in}$ for each color of RGB. If No, the processing proceeds to Step S302, where arithmetic is performed on $X_{out}=(1-C_x) \cdot X_{in}^2 + C_x \cdot X_{in}$. Next, the processing ends, and a video signal based on $X_{out}$ thus obtained is outputted to the display unit.

Figure 15:
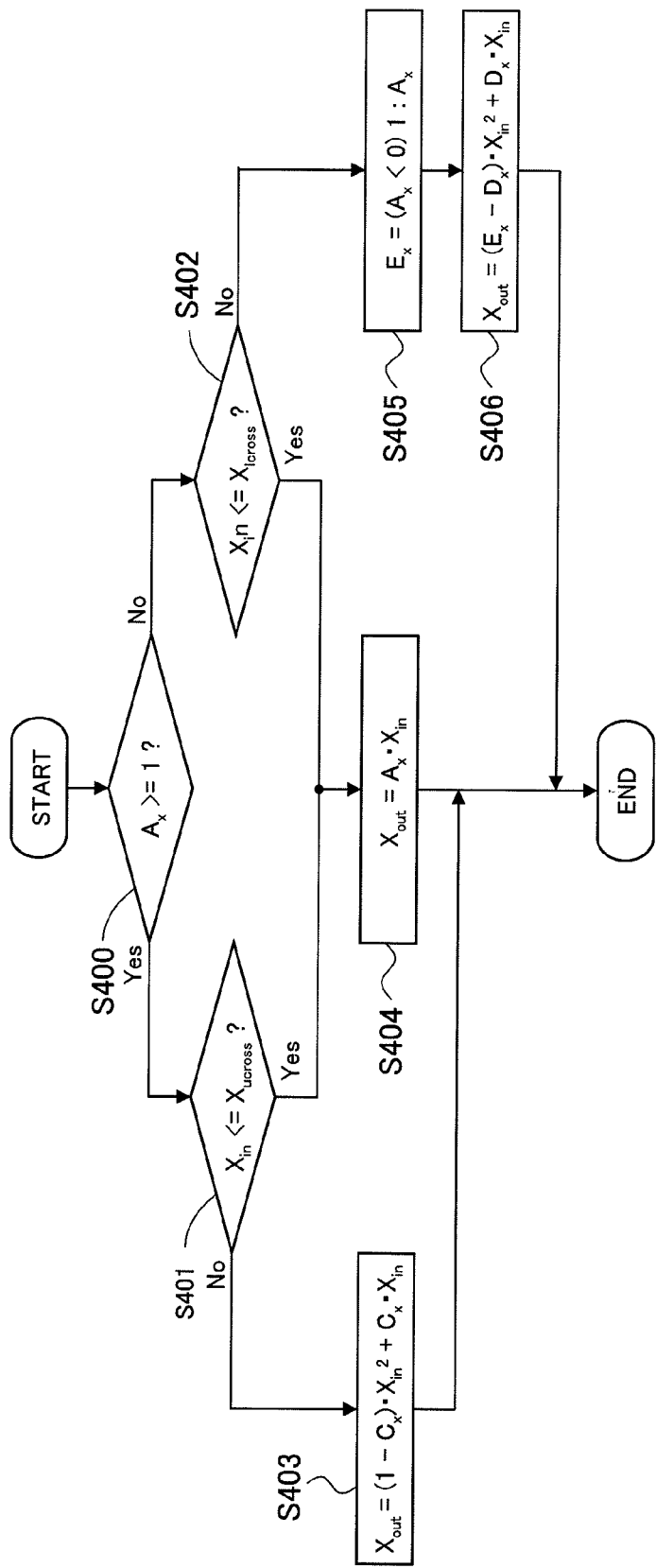
FIG. 15 is a flowchart optimized for software processing for performing the image processing technique according to the second embodiment.

FIG. 15 is a flowchart optimized for software processing for performing the image processing technique according to the second embodiment. A cross-point between $X_{linear}$ and $X_{ucurve}$ (referred to as a upper cross-point $X_{ucross}$ herein) and a cross-point of $X_{linear}$ and $X_{lcurve}$ (referred to as a lower cross-point $X_{lcross}$ herein) are obtained in advance (before performing the flowchart shown in FIG. 15). The upper cross-point/lower cross point ($X_{ucross}$, $X_{ucross}$) may be designed to be stored in the above-described storage unit, and to be read before the execution. The upper cross-point ($X_{ucross}$) is obtained as $X_{in}$ at which $X_{linear}=X_{ucurve}$ by use of Equation (2-6) and Equation (2-7) given earlier. The lower cross-point ($X_{lcross}$) is obtained as $X_{in}$ at which $X_{linear}=X_{lcurve}$ by use of Equation (2-6) and Equation (2-8) given earlier. The upper cross-point ($X_{ucross}$) can be obtained as in the case of the cross-point ($X_{cross}$) described above.

Thus, the upper cross-point is $X_{ucross}=(A_x-C_x)/(1-C_x)$. A specific solving method for the lower cross-point is shown below.

$$A_x \cdot X_{lcross} = (E_x-D_x) \cdot X_{lcross}^2 + D_x \cdot X_{lcross}$$

$$(E_x-D_x) \cdot X_{lcross}^2 + (D_x-A_x) \cdot X^{lcross} = 0$$

$$(E_x-D_x) \cdot X_{lcross} = -(D_x-A_x)$$

Thus, the lower cross-point is $X_{lcross}=(A_x-D_x)/(E_x-D_x)$.

As FIG. 15 shows, the processing starts (START), and whether $A_x>1$ or not is determined in Step S400. If Yes, the processing proceeds to Step S401, where whether $X_{in}<=X_{ucross}$ or not is determined. On the other hand, if No in Step S400, whether $X_{in}<=X_{lcross}$ or not is determined.

If No the result in Step S401, the processing proceeds to Step S403, where $X_{out}=(1-C_x) \cdot X_{in}^2 + C_x \cdot X_{in}$ is obtained. If Yes in Step S401, and if Yes in Step S402, the processing proceeds to Step S404, where $X_{out}$ is obtained by use of $X_{out}=A_x \cdot X_{in}$. If No in Step S402, the processing proceeds to Step S405, where $E_x$ is obtained as $E_x=1$ ($A_x<0$) and $E_x=A_x$ ($A_x>=0$). Then, the processing further proceeds to Step S406, where $X_{out}=(E_x-D_x) \cdot X_{in}^2 + D_x \cdot X_{in}$ is obtained. $X_{out}$ thus obtained is outputted to the display device.

The flowcharts described above show examples of the flows of the processes for simply pursuing, through software processing, the first embodiment and the second embodiment of the image processing techniques of the present embodiments. Such processing simplifies the software processing, and thus can reduce the processing load. Specifically, the scope of the present invention also includes the program for causing a computer to execute the functions of the video signal processing circuit described above.

As described above, according to the embodiments of the present invention, degradation in the maximum luminance due to correction processing can be suppressed while the hue of white is maintained in the practical luminance range (0 to 70%) for TV video images or the like. Furthermore, the brightness of a displayed image can be maintained as well.

INDUSTRIAL APPLICABILITY

The present invention is usable for an image display device.

The invention claimed is:

1. A video signal processing circuit that includes a white corrector configured to convert an input value of each of RGB video signals into an output value of the corresponding one of the RGB video signals, the video signal processing circuit being characterized in that:
the white corrector is configured to
convert the input value by using a first input-output characteristic in a region where the input value is equal to or smaller than a predetermined value (note that 0< the predetermined value <255), the first input-output characteristic being represented by a straight line passing through an origin and causing the output value to take a value smaller than a maximum value, and
convert the input value by using a second input-output characteristic in a region where the input value is equal to or larger than the predetermined value, the second input-output characteristic causing the output value to take a value equal to an output value of the first input-output characteristic when the input value is equal to the predetermined value, and causing the output value to take a maximum value when the input value is at a maximum value; and
in the conversion by the white corrector,
the gradient of the straight line of the first input-output characteristic is 1 or larger for at least one of the colors of RGB,
the gradient of the straight line of the first input-output characteristic is less than 1 for at least other one of the colors of RGB, and
luminance of an output video image of the white corrector is coincident with luminance of the input video image of the white corrector, wherein
the color that the gradient of the straight line of the first input-output characteristic is 1 or larger is one of the RGB, and, the color that the gradient of the straight line of the first input-output characteristic is less than 1 is another one of the RGB, and ratio among each color of RGB is maintained constant in the region where the input value is equal to or smaller than the predetermined value.

2. The video signal processing circuit according to claim 1, wherein the second input-output characteristic is represented by an n-degree curve ($n \geq 1$).

3. The video signal processing circuit according to claim 2, wherein, for all of RGB, the predetermined value is a value exceeding 70% of a possible maximum value of the input value.

4. A display device comprising:
the video signal processing circuit according to claim 2; and
a display unit configured to display a video image based on a video signal processed by the video signal processing circuit.

5. The video signal processing circuit according to claim 1, wherein,
for all of RGB, the predetermined value is a value exceeding 70% of a possible maximum value of the input value.

6. A display device comprising:
the video signal processing circuit according to claim 5; and
a display unit configured to display a video image based on a video signal processed by the video signal processing circuit.

7. The video signal processing circuit according to claim 1, wherein
the second input-output characteristic of the one color is represented by an $n(n \geq 2)$-degree curve curving upward, and
the second input-output characteristic of the other color is represented by an $n(n \geq 2)$-degree curve curving downward.

8. A display device comprising:
the video signal processing circuit according to claim 7; and
a display unit configured to display a video image based on a video signal processed by the video signal processing circuit.

9. A display device comprising:
the video signal processing circuit according to claim 1; and
a display unit configured to display a video image based on a video signal processed by the video signal processing circuit.

10. The display device according to claim 9, wherein by further comprising an operation unit configured to perform an operation of changing at least any one of the straight-line inclination and a curvature of the n-degree curve (n≧2).

11. A mobile terminal device comprising:
the display device according to claim 10; and
a communications unit configured to perform communications.

12. A mobile terminal device comprising:
the display device according to claim 9; and
a communications unit configured to perform communications.

13. A computer-readable non-transitory recording medium encoded with instructions that cause a computer to execute functions of a video signal processing circuit including a white corrector configured to convert an input value of each of RGB video signals into an output value of the corresponding one of the RGB video signals, the functions including:
converting the input value of each of the RGB video signals by using a first input-output characteristic in a region where the input value is equal to or smaller than a predetermined value between 0 and 255, the first input-output characteristic being represented by a straight line passing through an origin and causing the output value to take a value smaller than a maximum value; and
converting the input value by using a second input-output characteristic in a region where the input value of each of the RGB video signals is equal to or larger than the predetermined value, the second input-output characteristic
causing the output value to take a value equal to an output value of the first input-output characteristic when the input value is equal to the predetermined value, and
causing the output value to take a maximum value when the input value is at a maximum value, wherein
in the converting by the white corrector the gradient of the straight line of the first input-output characteristic is 1 or larger for at least one of the colors of RGB,
the gradient of the straight line of the first input-output characteristic is less than 1 for at least other one of the colors of RGB, and
luminance of an output video image of the white corrector is coincident with luminance of the input video image of the white corrector, the color that the gradient of the straight line of the first input-output characteristic is 1 or larger is one of the RGB, and, the color that the gradient of the straight line of the first input-output characteristic is less than 1 is another one of the RGB, and
ratio among each color of RGB is maintained constant in the region where the input value is equal to or smaller than the predetermined value.

14. The computer-readable non-transitory recording medium according to claim 13, wherein
the second input-output characteristic is represented by an n-degree curve with n≧1.

15. A video signal processing circuit that includes a white corrector configured to convert an input value of each of RGB video signals into an output value of the corresponding one of the RGB video signals, the video signal processing circuit being characterized in that:
the white corrector is configured to
convert the input value by using a first input-output characteristic in a region where the input value is equal to or smaller than a predetermined value (note that 0< the predetermined value <255), the first input-output characteristic being represented by a straight line passing through an origin and causing the output value to take a value smaller than a maximum value, and
convert the input value by using a second input-output characteristic in a region where the input value is equal to or larger than the predetermined value, the second input-output characteristic causing the output value to take a value equal to an output value of the first input-output characteristic when the input value is equal to the predetermined value, and causing the output value to take a maximum value when the input value is at a maximum value; and
in the conversion by the white corrector,
the gradient of the straight line of the first input-output characteristic is 1 or larger for at least one of the colors of RGB,
the gradient of the straight line of the first input-output characteristic is less than 1 for at least other one of the colors of RGB, and
luminance of an output video image of the white corrector is coincident with luminance of the input video image of the white corrector, wherein
a first one of the colors of RGB has the first input-output characteristic with a slope equal to 1,
the gradient of the straight line of the first input-output characteristic is 1 or larger for a second one of the colors of RGB,
the gradient of the straight line of the first input-output characteristic is less than 1 for a third one of the colors of RGB, and
ratio among each of the first, second, and third colors of RGB is maintained constant in the region where the input value is equal to or smaller than the predetermined value.

* * * * *